(12) United States Patent
Takida

(10) Patent No.: US 9,071,128 B2
(45) Date of Patent: Jun. 30, 2015

(54) DC-DC CONVERTER

(71) Applicant: Kabushiki Kaisha Toshiba, Minato-ku (JP)

(72) Inventor: Takayuki Takida, Tokyo (JP)

(73) Assignee: Kabushiki Kaisha Toshiba, Minato-ku, Tokyo (JP)

( * ) Notice: Subject to any disclaimer, the term of this patent is extended or adjusted under 35 U.S.C. 154(b) by 128 days.

(21) Appl. No.: 13/973,255

(22) Filed: Aug. 22, 2013

(65) Prior Publication Data

US 2014/0232358 A1   Aug. 21, 2014

(30) Foreign Application Priority Data

Feb. 20, 2013   (JP) ................................ 2013-031280

(51) Int. Cl.
*G05F 1/00* (2006.01)
*H02M 3/07* (2006.01)

(52) U.S. Cl.
CPC ....................................... *H02M 3/07* (2013.01)

(58) Field of Classification Search
CPC ................................ H02M 3/04; H02M 3/07
USPC ......... 323/222–225, 234, 268–275, 282–288;
363/60, 62; 327/536–543
See application file for complete search history.

(56) References Cited

U.S. PATENT DOCUMENTS

| | | | |
|---|---|---|---|
| 3,470,446 A * | 9/1969 | Berry et al. ...................... 363/62 |
| 5,461,557 A | 10/1995 | Tamagawa | |
| 5,532,916 A | 7/1996 | Tamagawa | |
| 5,623,222 A | 4/1997 | Tamagawa | |
| 6,979,982 B2 * | 12/2005 | Herbert ......................... 323/272 |
| 7,084,864 B1 * | 8/2006 | Wood ............................ 345/211 |
| 7,265,705 B1 * | 9/2007 | Lee et al. ...................... 341/162 |
| 7,279,957 B2 * | 10/2007 | Yen ............................... 327/536 |
| 7,345,530 B1 * | 3/2008 | Li et al. ............................ 330/9 |
| 7,453,711 B2 * | 11/2008 | Yanagida et al. ................ 363/59 |
| 7,903,017 B2 * | 3/2011 | Hsieh et al. .................... 341/161 |
| 7,990,742 B2 * | 8/2011 | Lesso .............................. 363/62 |
| 8,278,991 B2 * | 10/2012 | Shiwaya ....................... 327/536 |
| 8,493,131 B2 * | 7/2013 | Mo et al. ....................... 327/530 |
| 8,553,112 B2 * | 10/2013 | Kawahito ..................... 348/255 |
| 8,742,833 B2 * | 6/2014 | Hsu et al. ...................... 327/536 |
| 8,791,748 B2 * | 7/2014 | Nishida ......................... 327/536 |
| 2002/0051372 A1 * | 5/2002 | Hoshino et al. ................. 363/60 |
| 2003/0197696 A1 * | 10/2003 | Onozawa et al. .............. 345/212 |
| 2006/0284754 A1 * | 12/2006 | Garrity et al. .................. 341/172 |
| 2007/0040588 A1 * | 2/2007 | Braswell et al. ................ 327/94 |
| 2007/0147103 A1 * | 6/2007 | Yamamura ..................... 365/145 |

(Continued)

FOREIGN PATENT DOCUMENTS

| | | |
|---|---|---|
| JP | 2011-30394 | 2/2011 |
| JP | 2011-067039 | 3/2011 |
| JP | 2013-183485 A | 9/2013 |

*Primary Examiner* — Timothy J Dole
*Assistant Examiner* — Yusef Ahmed
(74) *Attorney, Agent, or Firm* — White & Case LLP

(57) ABSTRACT

DC-DC converter, wherein in a case of positive voltage generation, the controlling circuit controls the first to fourth switch circuits with the first to fourth controlling signals, thereby permitting conduction between the first node and the first reference node and conduction between the eighth node and the fourth reference node, then permitting conduction between the fourth node and the second reference node and conduction between the sixth node and the third reference node, and then permitting conduction between the second node and the first reference node.

19 Claims, 15 Drawing Sheets

(56) References Cited

U.S. PATENT DOCUMENTS

| | | | |
|---|---|---|---|
| 2008/0272833 A1* | 11/2008 | Ivanov et al. | 327/536 |
| 2010/0181974 A1* | 7/2010 | Chen | 323/282 |
| 2011/0090173 A1* | 4/2011 | Huang et al. | 345/174 |
| 2011/0274295 A1* | 11/2011 | Motoki | 381/120 |
| 2012/0056606 A1* | 3/2012 | Kousai | 323/282 |
| 2012/0112724 A1 | 5/2012 | Nishida | |
| 2013/0043848 A1* | 2/2013 | Lin | 323/234 |
| 2013/0223650 A1 | 8/2013 | Takida | |
| 2013/0300385 A1* | 11/2013 | Li et al. | 323/271 |

* cited by examiner

DC-DC CONVERTER

CROSS-REFERENCE TO RELATED APPLICATION

This application is based upon and claims the benefit of priority from the prior Japanese Patent Application No. 2013-031280, filed on Feb. 20, 2013, the entire contents of which are incorporated herein by reference.

BACKGROUND

1. Field

Embodiments described herein relate to a DC-DC Converter.

2. Background Art

There are step-down positive voltage generating charge pump DC-DC converters including a flying capacitor and a decoupling capacitor and inverting negative voltage generating charge pump DC-DC converters including a flying capacitor and a decoupling capacitor.

DETAILED DESCRIPTION

In the following, embodiments will be described with reference to the drawings.

First Embodiment

Figure 1:
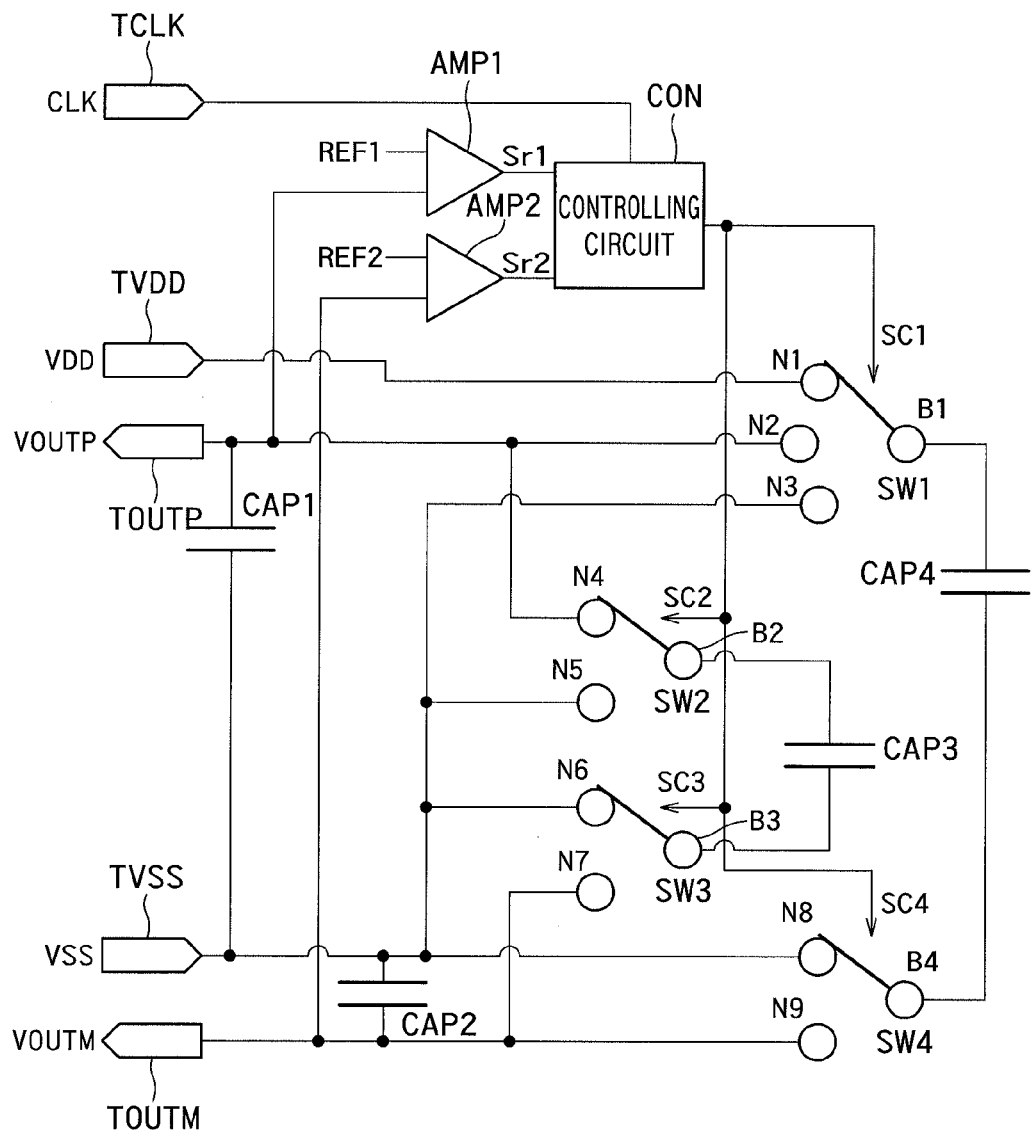
FIG. 1 is a diagram showing an example of a configuration of a DC-DC converter 100 according to a first embodiment.

FIG. 1 is a diagram showing an example of a configuration of a DC-DC converter 100 according to a first embodiment.

As shown in FIG. 1, the DC-DC converter 100 includes a clock terminal "TCLK", a power supply terminal "TVDD", a grounding terminal "TVSS", a positive voltage terminal "TOUTP", a negative voltage terminal "TOUTM", a first switch circuit "SW1", a second switch circuit "SW2", a third switch circuit "SW3", a fourth switch circuit "SW4", a first comparing circuit "AMP1", a second comparing circuit "AMP2" and a controlling circuit "CON".

The first switch circuit "SW1" is configured to permit conduction between a first reference node "B1" and any one of a first node "N1" connected to the power supply terminal "TVDD", a second node "N2" connected to the positive voltage terminal "TOUTP" at which a positive voltage "VOUTP" is output and a third node "N3" connected to the grounding terminal "TVSS" in response to a first controlling signal "SC1".

The second switch circuit "SW2" is configured to permit conduction between a second reference node "B2" and any one of a fourth node "N4" connected to the positive voltage terminal "TOUTP" and a fifth node "N5" connected to the grounding terminal "TVSS" in response to a second controlling signal "SC2".

The third switch circuit "SW3" is configured to permit conduction between a third reference node "B3" and any one of a sixth node "N6" connected to the grounding terminal "TVSS" and a seventh node "N7" connected to a negative voltage terminal "TOUTM" at which a negative voltage "VOUTM" is output in response to a third controlling signal "SC3".

The fourth switch circuit "SW4" is configured to permit conduction between a fourth reference node "B4" and any one of an eighth node "N8" connected to the grounding terminal "TVSS" and a ninth node "N9" connected to the negative voltage terminal "TOUTM" in response to a fourth controlling signal "SC4".

The first comparing circuit "AMP1" is configured to compare the voltage at the positive voltage terminal "TOUTP" and a preset positive first reference voltage "REF1" and output a first comparison signal "Sr1" depending on the comparison result.

The second comparing circuit "AMP2" is configured to compare the voltage at the negative voltage terminal "TOUTM" and a preset negative second reference voltage "REF2" and output a second comparison signal "Sr2" depending on the comparison result.

For example, the first reference voltage "REF1" is set to be equal to the absolute value of the second reference voltage "REF2".

The controlling circuit "CON" is configured to output the first to fourth controlling signals "SC1" to "SC4" based on the first and second comparison signals "Sr1" and "Sr2" to control operations of the first to fourth switch circuits "SW1" to "SW4".

For example, the controlling circuit "CON" generates the first to fourth controlling signals "SC1" to "SC4" from a clock signal "CLK", which is input thereto via the clock terminal "TCLK".

A first capacitor (a decoupling capacitor) "CAP1" is connected between the positive voltage terminal "TOUTP" and the grounding terminal "TVSS". That is, the first capacitor "CAP1" is connected external to the DC-DC converter 100.

A second capacitor (a decoupling capacitor) "CAP2" is connected between the grounding terminal "TVSS" and the negative voltage terminal "TOUTM". That is, the second capacitor "CAP2" is also connected external to the DC-DC converter 100.

A third capacitor (a switched decoupling capacitor) "CAP3" is connected between the second reference node "B2" and the third reference node "B3". That is, the third capacitor "CAP3" is also connected external to the DC-DC converter 100.

Although the first to third capacitors "CAP1" to "CAP3" are connected external to the DC-DC converter 100 as described above, the DC-DC converter 100 may contain the first to third capacitors "CAP1" to "CAP3" as required.

A fourth capacitor (a flyback capacitor) "CAP4" is connected between the first reference node "B1" and the fourth reference node "B4". That is, the fourth capacitor "CAP4" is also connected external to the DC-DC converter 100.

Note that although the fourth capacitor "CAP4" is connected external to the DC-DC converter 100 as described above, the DC-DC converter 100 may contain the fourth capacitor "CAP4" as required.

For example, the capacitance of the fourth capacitor "CAP4" is set to be equal to or lower than the capacitances of the first to third capacitors "CAP1" to "CAP3".

For example, the capacitance of the third capacitor "CAP3" is set to be equal to or lower than the capacitances of the first and second capacitors "CAP1" and "CAP2".

Next, an example of an operation of the DC-DC converter 100 configured as described above will be described.

Figure 2:
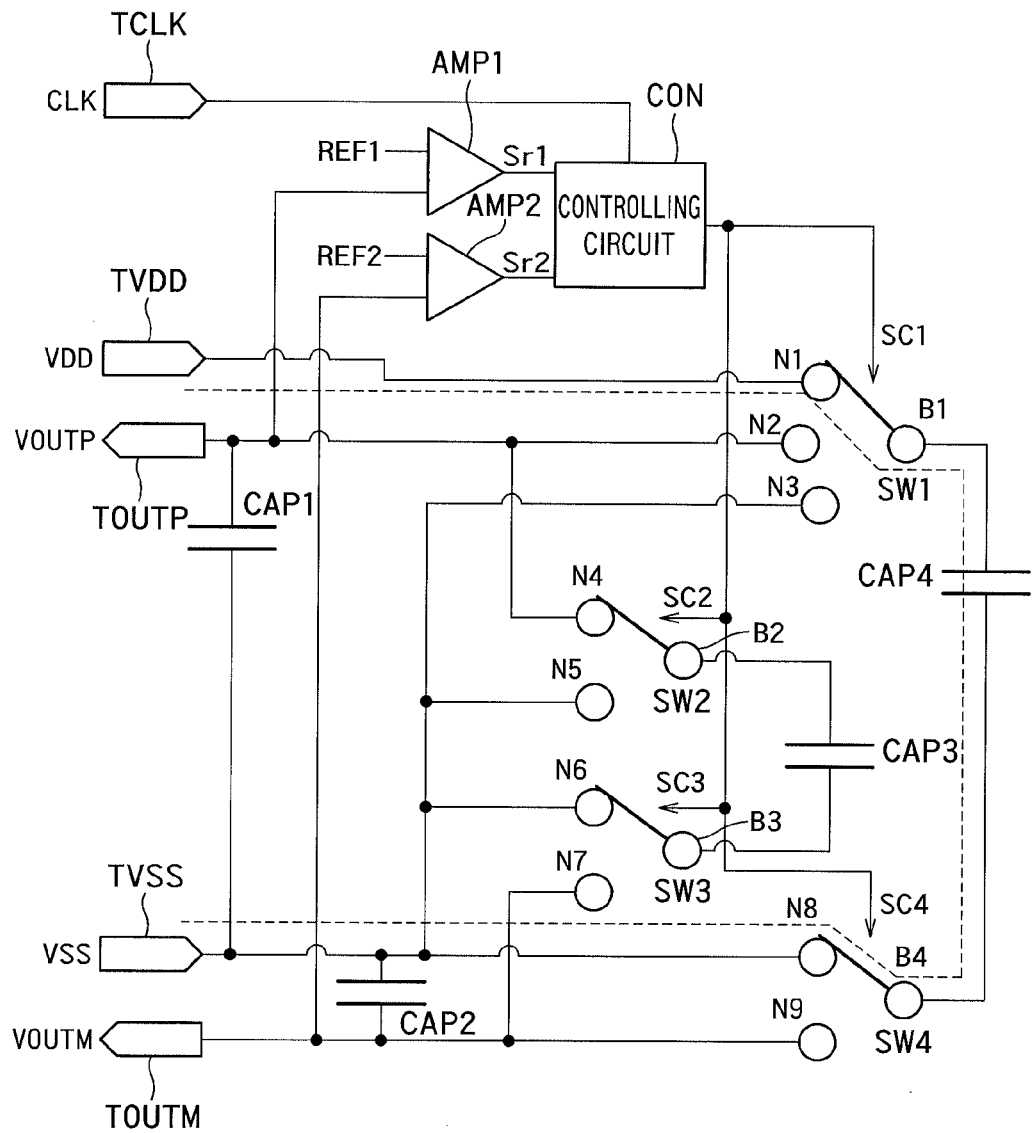
FIG. 2 is a circuit diagrams showing examples of the states of the first to fourth switch circuit "SW1" to "SW4" in the case of the positive voltage generation by the DC-DC converter 100 shown in FIG. 1.
Figure 3:
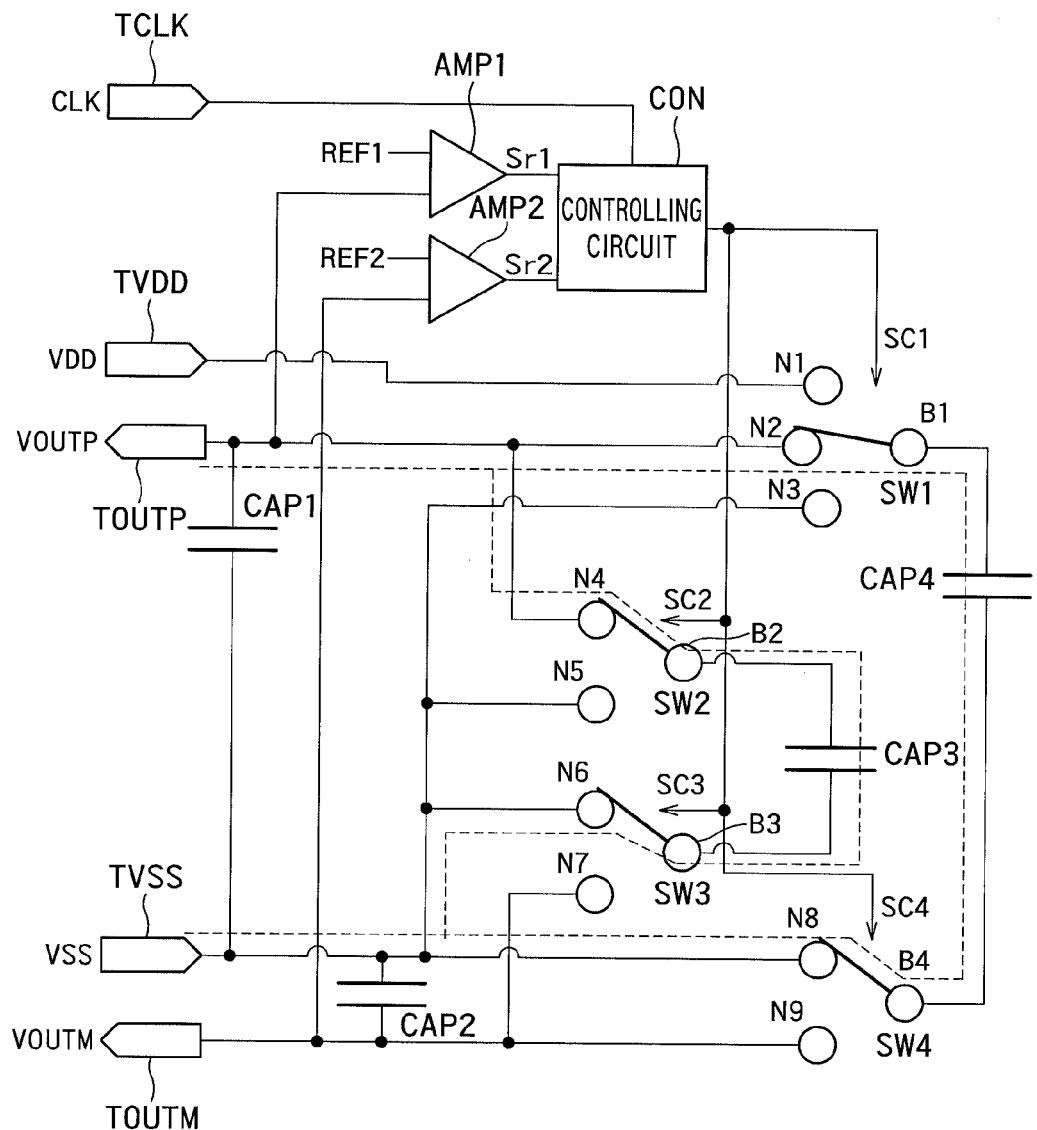
FIG. 3 is a circuit diagrams showing examples of the states of the first to fourth switch circuit "SW1" to "SW4" in the case of the positive voltage generation by the DC-DC converter 100 shown in FIG. 1.

First, an output voltage boosting operation in a case of positive voltage generation according to the first embodiment will be described. FIGS. 2 and 3 are circuit diagrams showing examples of the states of the first to fourth switch circuit "SW1" to "SW4" in the case of the positive voltage generation by the DC-DC converter 100 shown in FIG. 1.

For example, in the positive voltage generation, the controlling circuit "CON" controls the first to fourth switch circuits "SW1" to "SW4" with the first to fourth controlling signals "SC1" to "SC4", thereby permitting conduction between the first node "N1" and the first reference node "B1" and the connection between the eighth node "N8" and the fourth reference node "B4" (FIG. 2).

As a result, the fourth capacitor "CAP4" is charged.

At this point in time, in the example shown in FIG. 2, the second switch circuit "SW2" has permitted conduction between the fourth node "N4" and the second reference node "B2". Alternatively, however, the second switch circuit "SW2" may have permitted conduction between the fifth node "N5" and the second reference node "B2".

Similarly, in the example shown in FIG. 2, the third switch circuit "SW3" has permitted conduction between the sixth node "N6" and the third reference node "B3". Alternatively, however, the third switch circuit "SW3" may have permitted conduction between the seventh node "N7" and the third reference node "B3".

Then, the controlling circuit "CON" controls the first to fourth switch circuits "SW1" to "SW4" with the first to fourth controlling signals "SC1" to "SC4", thereby permitting conduction between the fourth node "N4" and the second reference node "B2" and conduction between the sixth node "N6" and the third reference node "B3" (FIG. 3).

Then, the controlling circuit "CON" controls the first to fourth switch circuits "SW1" to "SW4" with the first to fourth controlling signals "SC1" to "SC4", thereby permitting conduction between the second node "N2" and the first reference node "B1" (FIG. 3).

As a result, the first and third capacitors "CAP1" and "CAP3" and the fourth capacitor "CAP4" are connected in parallel with each other and exchange charges.

As a result, the voltage "VOUTP" at the positive voltage terminal "TOUTP" increases.

Since the ratio of the sum of the capacitances of the first capacitor "CAP1" and the third capacitor "CAP3" to the capacitance of the fourth capacitor "CAP4" increases, a ripple voltage at the positive voltage terminal "TOUTP" is reduced.

In the case of positive voltage generation, after conduction between the second node "N2" and the first reference node "B1" is permitted, if the voltage at the positive voltage terminal "TOUTP" is lower than the first reference voltage "REF1", the controlling circuit "CON" controls the first switch circuit "SW1" with the first controlling signal "SC1" to alternately switch between the state where the first node "N1" and the first reference node "B1" are conductive to each other and the state where the second node "N2" and the first reference node "B1" are conductive to each other.

On the other hand, in the case of the positive voltage generation, if the voltage at the positive voltage terminal "TOUTP" is equal to or higher than the first reference voltage "REF1", the controlling circuit "CON" controls the first switch circuit "SW1" with the first controlling signal "SC1" to keep the state where the second node "N2" and the first reference node "B1" are conductive to each other, for example.

Note that the second and third switch circuits "SW2" and "SW3" perform switching operations only when the connection of the fourth capacitor "CAP4" is switched from the positive voltage terminal "TOUTP" to the negative voltage terminal "TOUTM" and vice versa.

In addition, with the first to fourth controlling signals "SC1" to "SC4", the controlling circuit "CON" adjusts the timings of the first to fourth switch circuits "SW1" to "SW4" so as to prevent the first to fourth switch circuits "SW1" to "SW4" from being turned on at the same time.

By the operation described above, the voltage "VOUTP" at the positive voltage terminal "TOUTP" is controlled to be a predetermined value.

Next, an example of an output voltage boosting operation in a case of negative voltage generation according to the first embodiment will be described. In the following description, boosting in the case of the negative voltage generation means to decrease the potential of a negative voltage.

Figure 4:
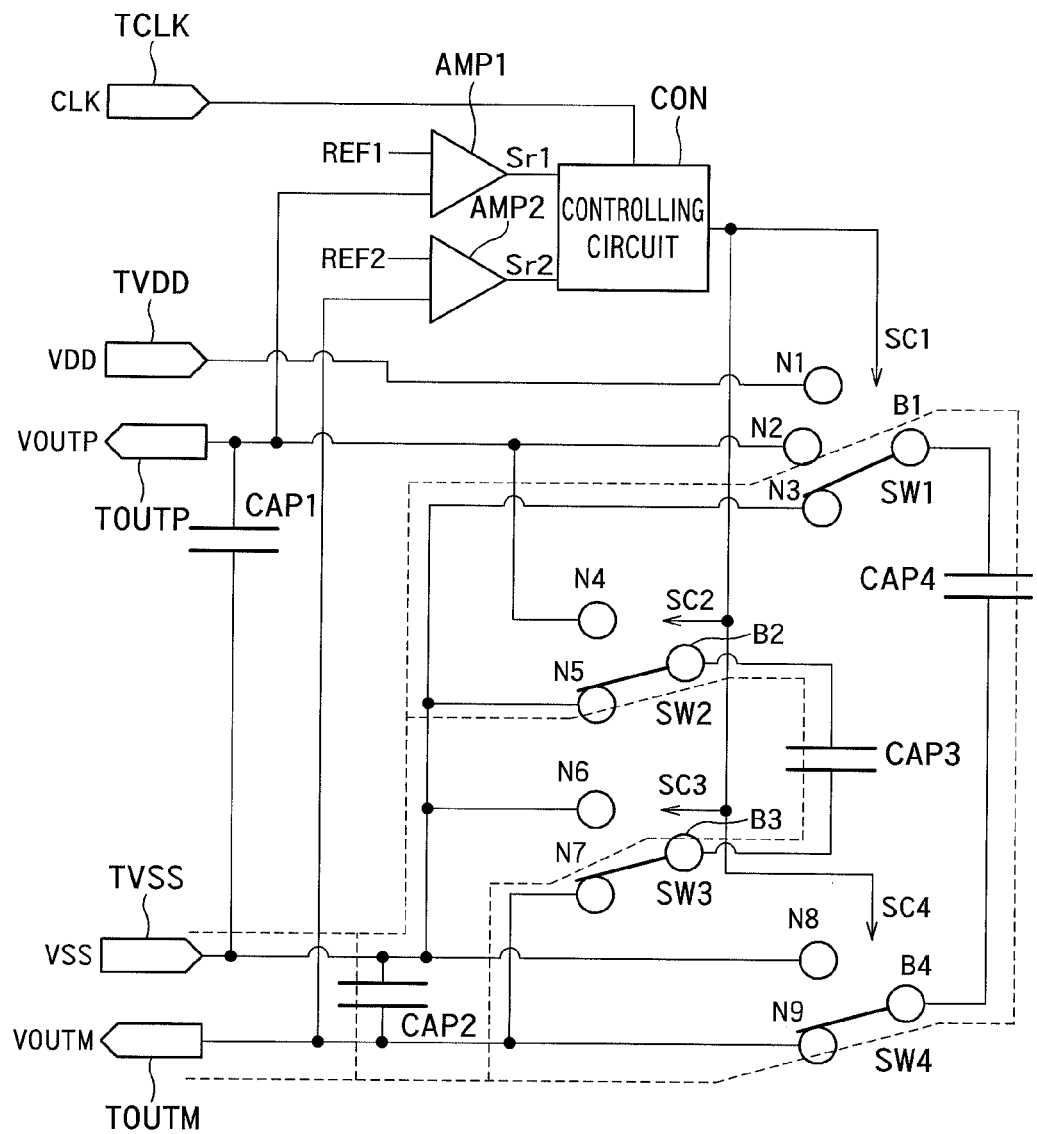
FIG. 4 is a circuit diagram showing an example of the states of the first to fourth switch circuit "SW1" to "SW4" in the case of the negative voltage generation by the DC-DC converter 100 shown in FIG. 1.

FIG. 4 is a circuit diagram showing an example of the states of the first to fourth switch circuit "SW1" to "SW4" in the case of the negative voltage generation by the DC-DC converter 100 shown in FIG. 1.

For example, in the case of the negative voltage generation, as in the positive voltage generation described above, the controlling circuit "CON" controls the first to fourth switch circuits "SW1" to "SW4" with the first to fourth controlling signals "SC1" to "SC4", thereby permitting conduction between the first node "N1" and the first reference node "B1" and conductive between the eighth node "N8" and the fourth reference node "B4" (FIG. 2).

As a result, as in the case of the positive voltage generation described above, the fourth capacitor "CAP4" is charged.

At this point in time, in the example shown in FIG. 2, the second switch circuit "SW2" has permitted conduction between the fourth node "N4" and the second reference node "B2". Alternatively, however, the second switch circuit "SW2" may have permitted conduction between the fifth node "N5" and the second reference node "B2".

Similarly, in the example shown in FIG. 2, the third switch circuit "SW3" has permitted conduction between the sixth node "N6" and the third reference node "B3". Alternatively, however, the third switch circuit "SW3" may have permitted conduction between the seventh node "N7" and the third reference node "B3".

Then, the controlling circuit "CON" controls the first to fourth switch circuits "SW1" to "SW4" with the first to fourth controlling signals "SC1" to "SC4", thereby permitting conduction between the fifth node "N5" and the second reference node "B2" and conduction between the seventh node "N7" and the third reference node "B3" (FIG. 4).

Then, the controlling circuit "CON" controls the first to fourth switch circuits "SW1" to "SW4" with the first to fourth controlling signals "SC1" to "SC4", thereby permitting conduction between the third node "N3" and the first reference node "B1" and conduction between the ninth node "N9" and the fourth reference node "B4" (FIG. 4).

As a result, the second and third capacitors "CAP2" and "CAP3" and the fourth capacitor "CAP4" are connected in parallel with each other and exchange charges.

As a result, the voltage "VOUTM" at the negative voltage terminal "TOUTM" increases.

Since the ratio of the sum of the capacitances of the second capacitor "CAP2" and the third capacitor "CAP3" to the capacitance of the fourth capacitor "CAP4" increases, a ripple voltage at the negative voltage terminal "TOUTM" is reduced.

In the case of the negative voltage generation, after conduction between the third node "N3" and the first reference node "B1" and conduction between the ninth node "N9" and the fourth reference node "B4" are permitted, if the voltage at the negative voltage terminal "TOUTM" is lower than the second reference voltage "REF2" (strictly speaking, if the absolute value of the voltage at the negative voltage terminal "TOUTM" is smaller than the absolute value of the second reference voltage "REF2"), the controlling circuit "CON" controls the first and fourth switch circuits "SW1" and "SW4" with the first and fourth controlling signals "SC1" and "SC4" to alternately switch between the state where the first node "N1" and the first reference node "B1" are conductive to each other and the eighth node "N8" and the fourth reference node "B4" are conductive to each other and the state where the third node "N3" and the first reference node "B1" are conductive to each other and the ninth node "N9" and the fourth reference node "B4" are conductive to each other.

On the other hand, in the negative voltage generation, if the voltage at the negative voltage terminal "TOUTM" is equal to or higher than the second reference voltage "REF2" (strictly speaking, if the absolute value of the voltage at the negative voltage terminal "TOUTM" is equal to or greater than the absolute value of the second reference voltage "REF2"), the controlling circuit "CON" controls the first and fourth switch circuits "SW1" and "SW4" with the first and fourth controlling signals "SC1" and "SC4" to keep the state where the third node "N3" and the first reference node "B1" are conductive to each other and the ninth node "N9" and the fourth reference node "B4" are conductive to each other, for example.

Note that the second and third switch circuits "SW2" and "SW3" perform switching operations only when the connection target of the fourth capacitor "CAP4" is switched from the positive voltage terminal "TOUTP" to the negative voltage terminal "TOUTM" and vice versa.

In addition, with the first to fourth controlling signals "SC1" to "SC4", the controlling circuit "CON" adjusts the timings of the first to fourth switch circuits "SW1" to "SW4" so as to prevent the first to fourth switch circuits "SW1" to "SW4" from being turned on at the same time.

By the operation described above, the voltage "VOUTM" at the negative voltage terminal "TOUTM" is controlled to be a predetermined value.

Next, another example of the output voltage boosting operation in the case of the negative voltage generation according to the first embodiment will be described.

Figure 5:
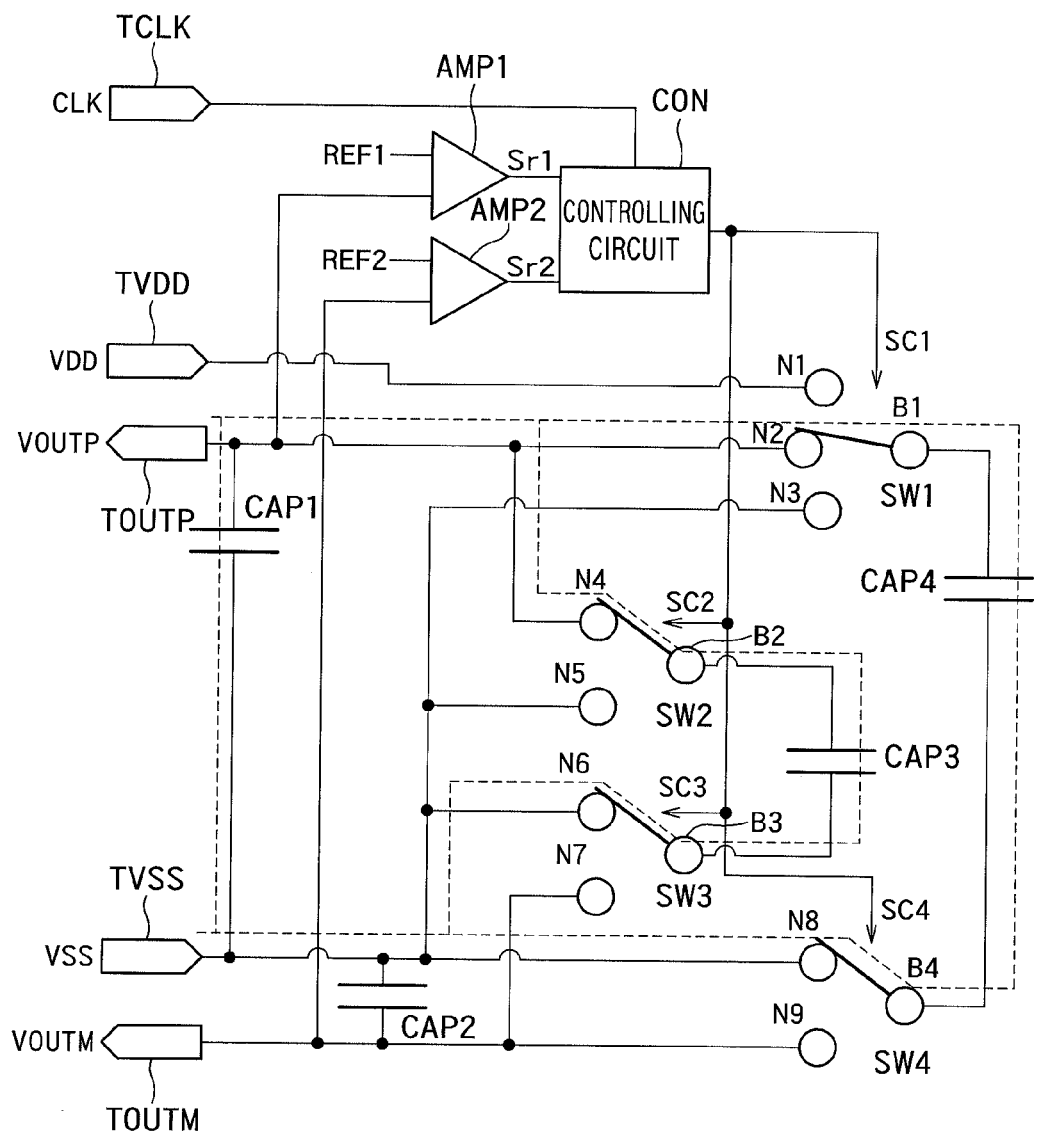
FIG. 5 is a circuit diagram showing another example of the states of the first to fourth switch circuit "SW1" to "SW4" in the case of the negative voltage generation by the DC-DC converter 100 shown in FIG. 1.
Figure 6:
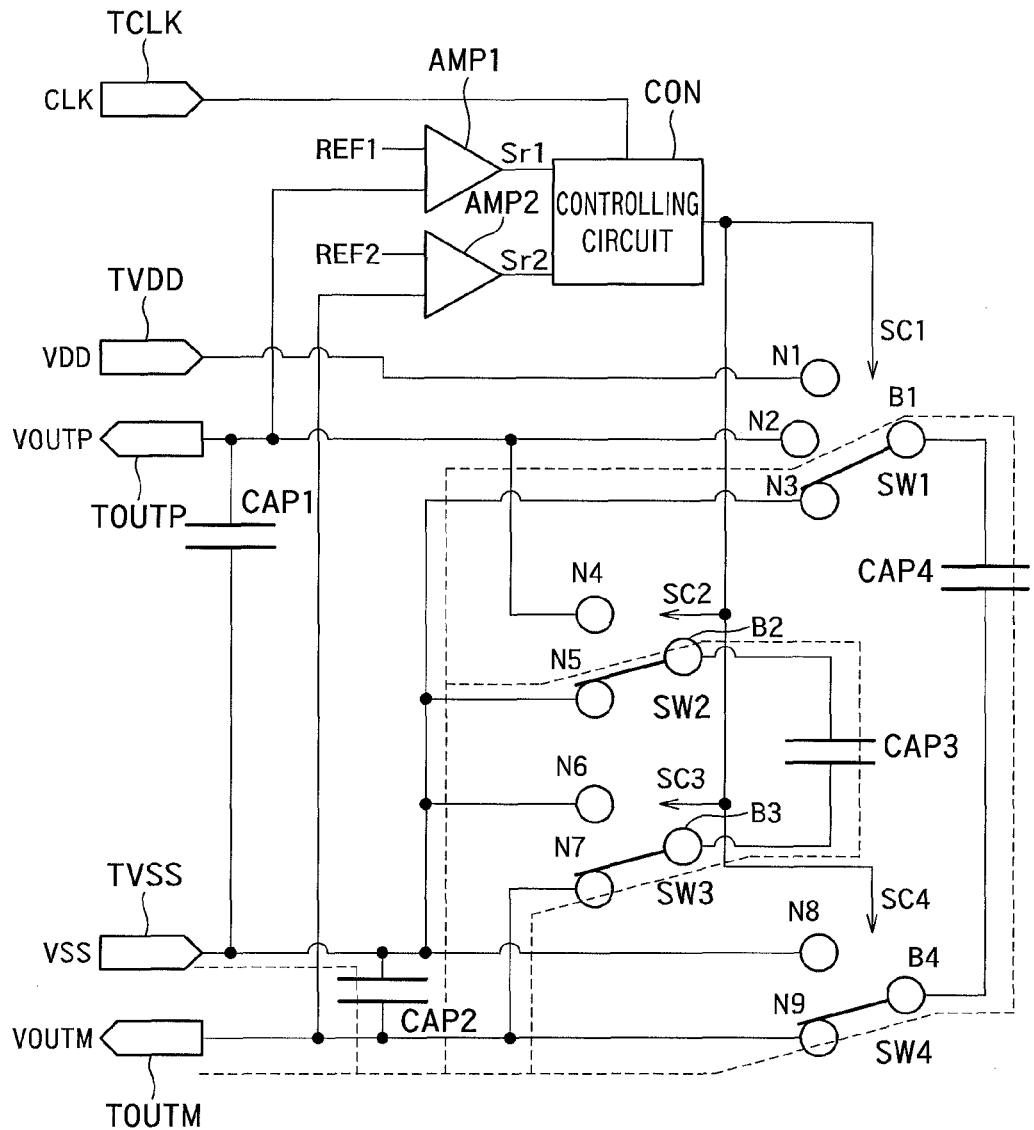
FIG. 6 is a circuit diagram showing another example of the states of the first to fourth switch circuit "SW1" to "SW4" in the case of the negative voltage generation by the DC-DC converter 100 shown in FIG. 1.

FIGS. 5 and 6 are circuit diagrams showing another example of the states of the first to fourth switch circuit "SW1" to "SW4" in the case of the negative voltage generation by the DC-DC converter 100 shown in FIG. 1.

As shown in FIG. 5, in the case of the negative voltage generation, the controlling circuit "CON" controls the first to fourth switch circuits "SW1" to "SW4" with the first to fourth controlling signals "SC1" to "SC4", thereby permitting conduction between the second node "N2" and the first reference node "B1" and the connection between the eighth node "N8" and the fourth reference node "B4".

As a result, the fourth capacitor "CAP4" is charged.

At this point in time, in the example shown in FIG. 5, the second switch circuit "SW2" has permitted conduction between the fourth node "N4" and the second reference node "B2". Alternatively, however, the second switch circuit "SW2" may have permitted conduction between the fifth node "N5" and the second reference node "B2".

Similarly, in the example shown in FIG. 5, the third switch circuit "SW3" has permitted conduction between the sixth node "N6" and the third reference node "B3". Alternatively, however, the third switch circuit "SW3" may have permitted conduction between the seventh node "N7" and the third reference node "B3".

Then, the controlling circuit "CON" controls the first to fourth switch circuits "SW1" to "SW4" with the first to fourth controlling signals "SC1" to "SC4", thereby permitting conduction between the fifth node "N5" and the second reference node "B2" and conduction between the seventh node "N7" and the third reference node "B3" (FIG. 6).

Then, the controlling circuit "CON" controls the first to fourth switch circuits "SW1" to "SW4" with the first to fourth controlling signals "SC1" to "SC4", thereby permitting conduction between the third node "N3" and the first reference node "B1" and conduction between the ninth node "N9" and the fourth reference node "B4" (FIG. 6).

As a result, the second and third capacitors "CAP2" and "CAP3" and the fourth capacitor "CAP4" are connected in parallel with each other and exchange charges.

As a result, the voltage "VOUTM" at the negative voltage terminal "TOUTM" increases.

Since the ratio of the sum of the capacitances of the second capacitor "CAP2" and the third capacitor "CAP3" to the capacitance of the fourth capacitor "CAP4" increases, a ripple voltage at the negative voltage terminal "TOUTM" is reduced.

In the case of the negative voltage generation, after conduction between the third node "N3" and the first reference node "B1" is permitted, if the voltage at the negative voltage terminal "TOUTM" is lower than the second reference voltage "REF2" (strictly speaking, if the absolute value of the voltage at the negative voltage terminal "TOUTM" is smaller than the absolute value of the second reference voltage "REF2"), the controlling circuit "CON" controls the first switch circuit "SW1" with the first controlling signal "SC1" to alternately switch between the state where the second node "N2" and the first reference node "B1" are connected to each other and the state where the third node "N3" and the first reference node "B1" are connected to each other.

In addition, the controlling circuit "CON" controls the fourth switch circuit "SW4" with the fourth controlling signal "SC4" to alternately switch between the state where the eighth node "N8" and the fourth reference node "B4" are conductive to each other and the state where the ninth node "N9" and the fourth reference node "B4" are conductive to each other.

On the other hand, in the negative voltage generation, if the voltage at the negative voltage terminal "TOUTM" is equal to or higher than the second reference voltage "REF2" (strictly speaking, if the absolute value of the voltage at the negative voltage terminal "TOUTM" is equal to or greater than the absolute value of the second reference voltage "REF2"), the controlling circuit "CON" controls the first switch circuit "SW1" with the first controlling signal "SC1" to keep the state where the third node "N3" and the first reference node "B1" are conductive to each other and the ninth node "N9" and the fourth reference node "B4" are conductive to each other, for example.

The second and third switch circuits "SW2" and "SW3" perform switching operations only when the connection target of the fourth capacitor "CAP4" is switched from the positive voltage terminal "TOUTP" to the negative voltage terminal "TOUTM" and vice versa.

In addition, with the first to fourth controlling signals "SC1" to "SC4", the controlling circuit "CON" adjusts the timings of the first to fourth switch circuits "SW1" to "SW4" so as to prevent the first to fourth switch circuits "SW1" to "SW4" from being turned on at the same time.

By the operation described above, the voltage "VOUTM" at the negative voltage terminal "TOUTM" is controlled to be a predetermined value.

Note that the controlling circuit "CON" may control the first switch circuit "SW1" with the first controlling signal "SC1" to randomly change the period for which the first node "N1" and the first reference node "B1" are conductive to each other.

For example, by discretely changing the period of the first controlling signal "SC1" by discretely changing the duty cycle of the clock signal "CLK" and the periods for which the switch circuits are not connected to any poles, the controlling circuit "CON" can randomly change the period for which the first node "N1" and the first reference node "B1" are conductive to each other, and can randomly change the period for which the eighth node "N8" and the fourth reference node "B4" are conductive to each other by controlling the fourth switch circuit "SW4" with the fourth controlling signal "SC4".

Alternatively, the controlling circuit "CON" may randomly change the period for which the second node "N2" and the first reference node "B1" are conductive to each other by controlling the first switch circuit "SW1" with the first controlling signal "SC1", and may randomly change the period for which the eighth node "N8" and the fourth reference node "B4" are conductive to each other by controlling the fourth switch circuit "SW4" with the fourth controlling signals "SC4".

For example, the controlling circuit "CON" can randomly change the period for which the second node "N2" and the first reference node "B1" are conductive to each other and the period for which the eighth node "N8" and the fourth reference node "B4" are conductive to each other by discretely changing the periods of the first and fourth controlling signals "SC1" and "SC4" by discretely changing the duty cycle of the clock signal "CLK" and the periods for which the switch circuits are not connected to any poles.

In this way, the maximum spurious level under a light load condition can be reduced.

As can be seen from the above description, the DC-DC converter according to the first embodiment can reduce the ripple voltage.

In addition, since the capacitance of the flying capacitor is increased while assuring a high capacitance ratio between the flying capacitor and the decoupling capacitor, the DC-DC converter is improved in load resistance current characteristics and can reduce the output ripple voltage.

Since the capacitances of the external capacitors depend on the size of the chip components, for products with high packaging densities, such as cellular phones and audio players, the size of capacitors can be adjusted depending on whether the purpose is to improve the load resistance current characteristics or to reduce the output ripple voltage.

Second Embodiment

Figure 7:
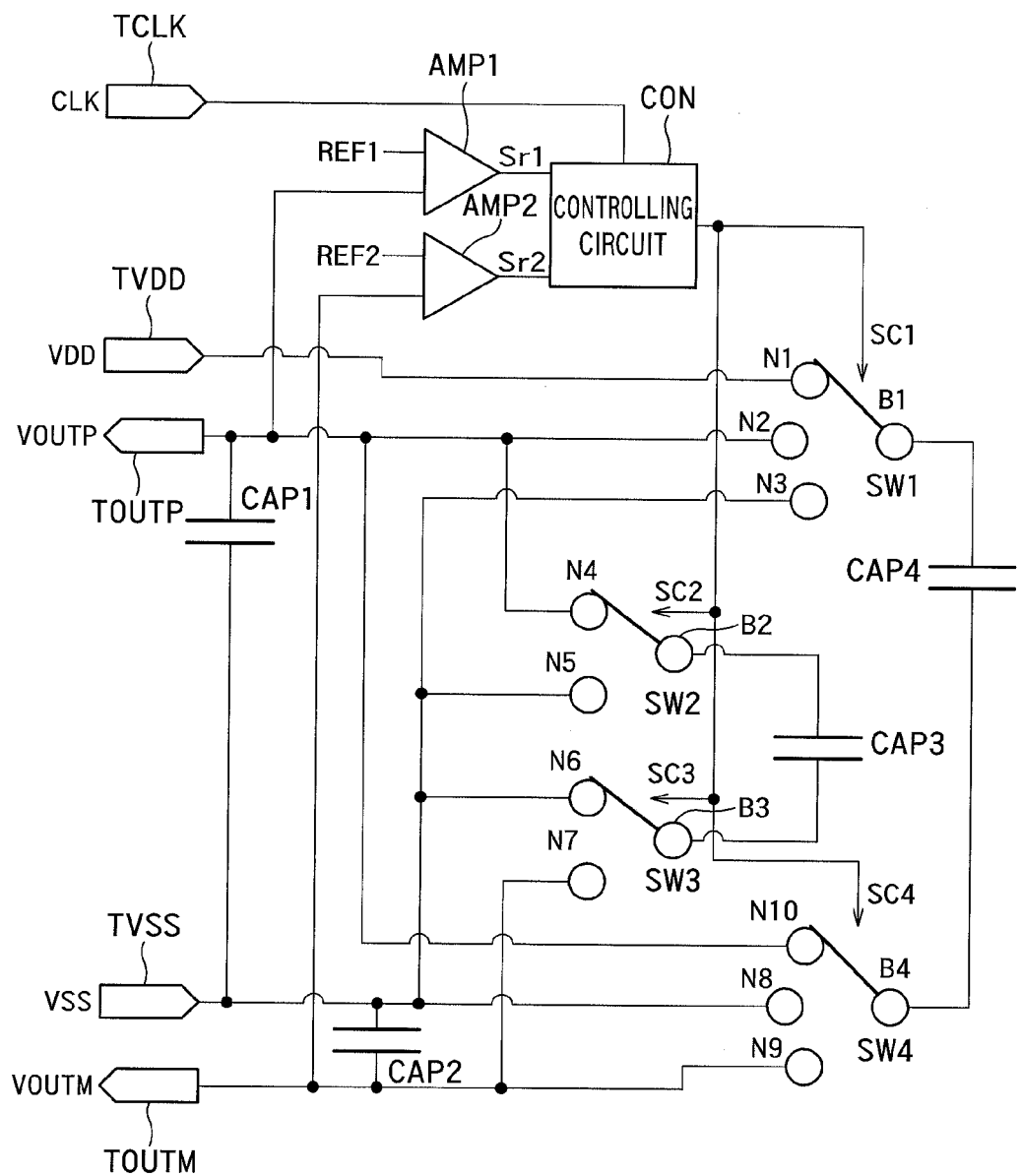
FIG. 7 is a circuit diagram showing an example of a configuration of a DC-DC converter 200 according to a second embodiment.

FIG. 7 is a circuit diagram showing an example of a configuration of a DC-DC converter 200 according to a second embodiment. In FIG. 7, the same reference symbols as those in FIG. 1 denote the same components as those in the first embodiment.

As shown in FIG. 7, the DC-DC converter 200 includes the clock terminal "TCLK", the power supply terminal "TVDD", the grounding terminal "TVSS", the positive voltage terminal "TOUTP", the negative voltage terminal "TOUTM", the first switch circuit "SW1", the second switch circuit "SW2", the third switch circuit "SW3", the fourth switch circuit "SW4", the first comparing circuit "AMP1", the second comparing circuit "AMP2" and the controlling circuit "CON".

In the second embodiment, the fourth switch circuit "SW4" is configured to permit conduction between the fourth reference node "B4" and any one of the eighth node "N8", the ninth node "N9" and a tenth node "N10" connected to the positive voltage terminal "TOUTP" in response to the fourth controlling signals "SC4".

The remainder of the configuration of the DC-DC converter 200 is the same as that of the DC-DC converter 100 shown in FIG. 1.

Next, an example of an operation of the DC-DC converter 200 configured as described above will be described.

Figure 8:
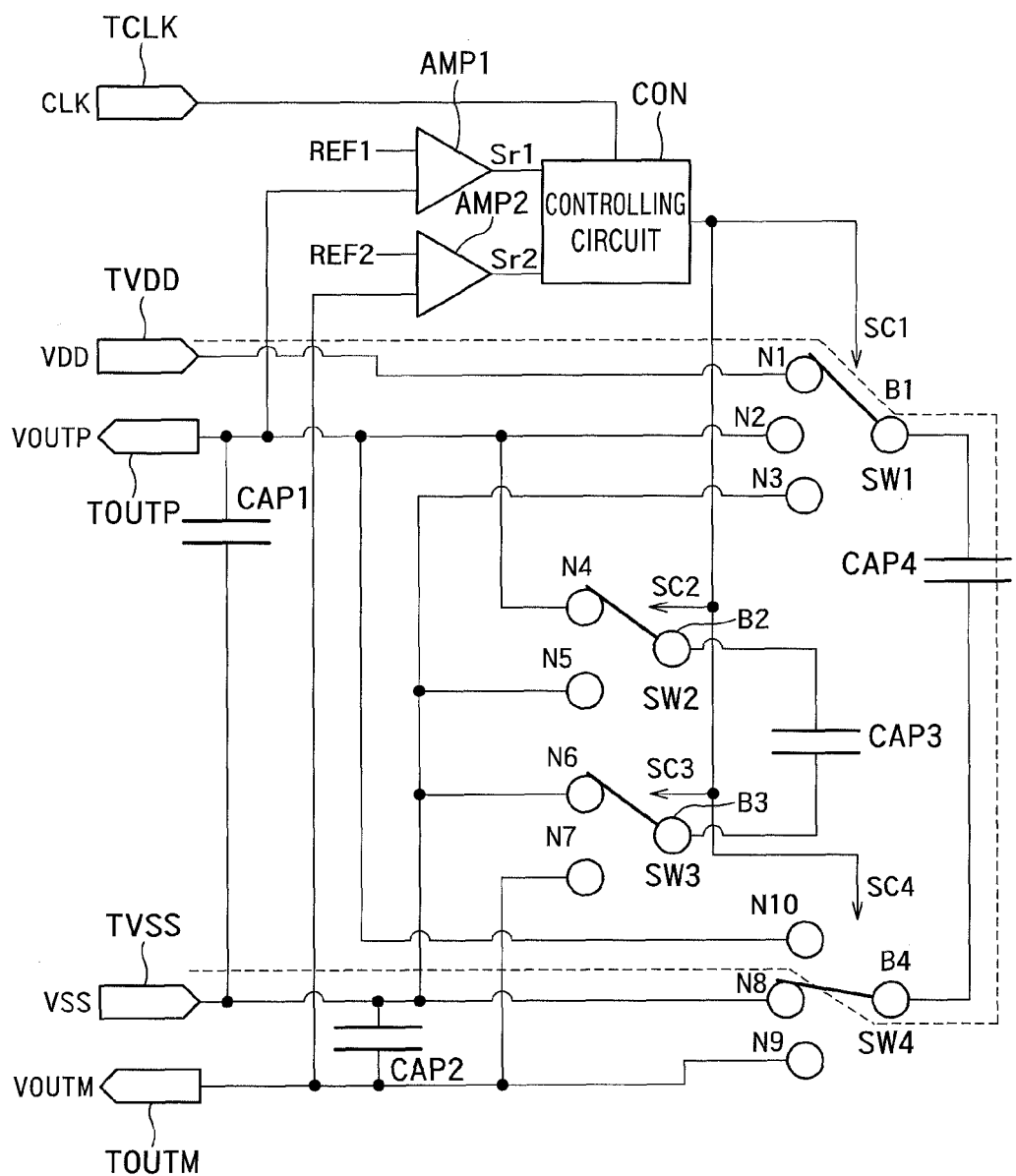
FIG. 8 is a circuit diagram showing examples of the states of the first to fourth switch circuit "SW1" to "SW4" in the case of the positive voltage generation by the DC-DC converter 200 shown in FIG. 7.
Figure 9:
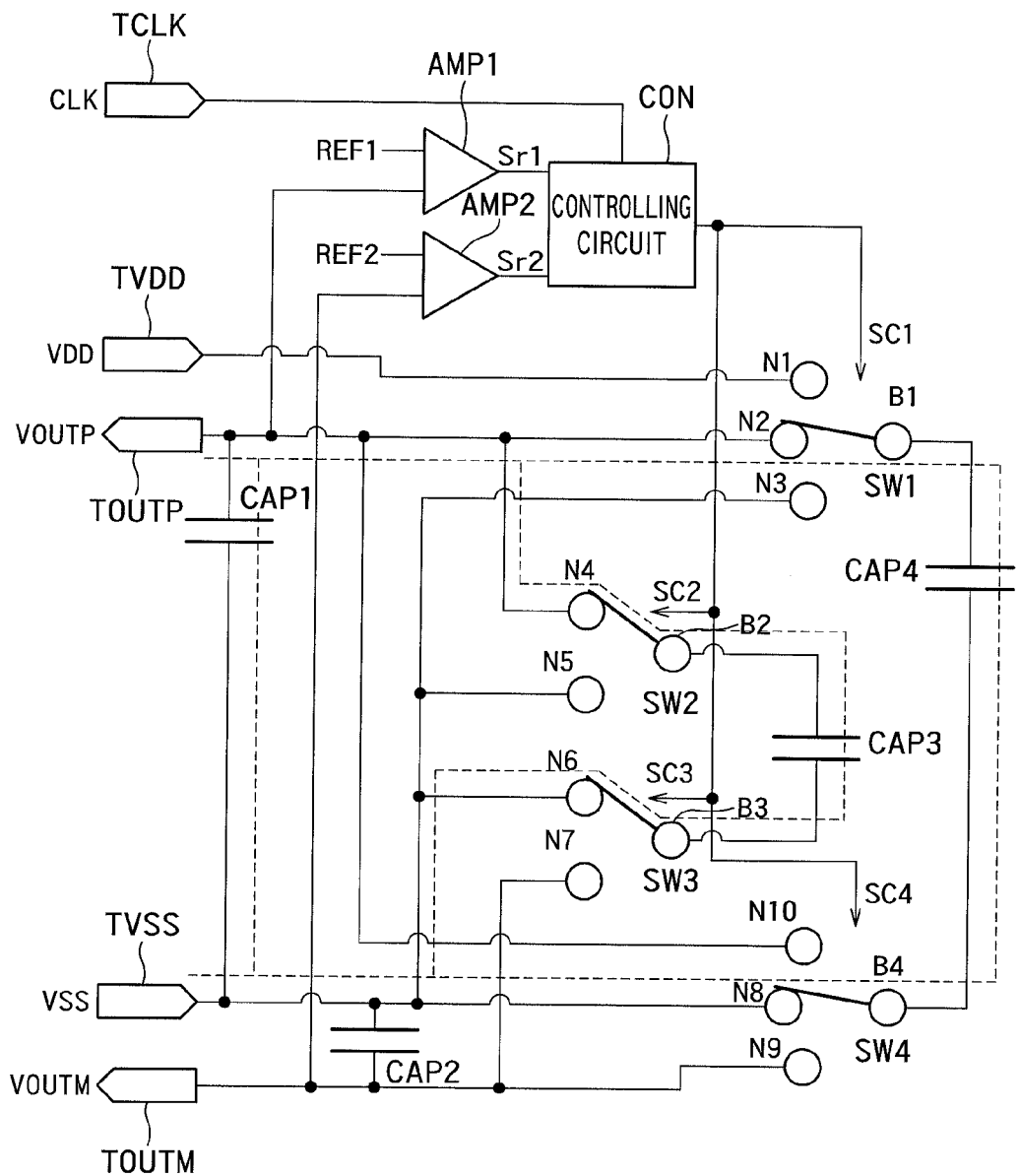
FIG. 9 is a circuit diagram showing examples of the states of the first to fourth switch circuit "SW1" to "SW4" in the case of the positive voltage generation by the DC-DC converter 200 shown in FIG. 7.

First, an example of an output voltage boosting operation in a case of positive voltage generation according to the second embodiment will be described. FIGS. 8 and 9 are circuit diagrams showing examples of the states of the first to fourth switch circuit "SW1" to "SW4" in the case of the positive voltage generation by the DC-DC converter 200 shown in FIG. 7.

For example, in the case of the positive voltage generation, the controlling circuit "CON" controls the first to fourth switch circuits "SW1" to "SW4" with the first to fourth controlling signals "SC1" to "SC4", thereby permitting conduction between the first node "N1" and the first reference node "B1" and the connection between the eighth node "N8" and the fourth reference node "B4" (FIG. 8).

As a result, the fourth capacitor "CAP4" is charged.

At this point in time, in the example shown in FIG. 8, the second switch circuit "SW2" has permitted conduction between the fourth node "N4" and the second reference node "B2". Alternatively, however, the second switch circuit "SW2" may have permitted conduction between the fifth node "N5" and the second reference node "B2".

Similarly, in the example shown in FIG. 8, the third switch circuit "SW3" has permitted conduction between the sixth node "N6" and the third reference node "B3". Alternatively, however, the third switch circuit "SW3" may have permitted conduction between the seventh node "N7" and the third reference node "B3".

Then, the controlling circuit "CON" controls the first to fourth switch circuits "SW1" to "SW4" with the first to fourth controlling signals "SC1" to "SC4", thereby permitting conduction between the fourth node "N4" and the second reference node "B2" and conduction between the sixth node "N6" and the third reference node "B3" (FIG. 9).

Then, the controlling circuit "CON" controls the first to fourth switch circuits "SW1" to "SW4" with the first to fourth controlling signals "SC1" to "SC4", thereby permitting conduction between the second node "N2" and the first reference node "B1" (FIG. 9).

As a result, the first and third capacitors "CAP1" and "CAP3", and the fourth capacitor "CAP4" are connected in parallel with each other and exchange charges.

As a result, the voltage "VOUTP" at the positive voltage terminal "TOUTP" increases.

Since the ratio of the sum of the capacitances of the first capacitor "CAP1" and the third capacitor "CAP3" to the capacitance of the fourth capacitor "CAP4" increases, a ripple voltage at the positive voltage terminal "TOUTP" is reduced.

In the case of the positive voltage generation, after conduction between the second node "N2" and the first reference node "B1" is permitted, if the voltage at the positive voltage terminal "TOUTP" is lower than the first reference voltage "REF1", the controlling circuit "CON" controls the first switch circuit "SW1" with the first controlling signal "SC1" to alternately switch between the state where the first node "N1" and the first reference node "B1" are conductive to each other and the state where the second node "N2" and the first reference node "B1" are conductive to each other.

On the other hand, in the case of the positive voltage generation, if the voltage at the positive voltage terminal "TOUTP" is equal to or higher than the first reference voltage "REF1", the controlling circuit "CON" controls the first switch circuit "SW1" with the first controlling signal "SC1" to keep the state where the second node "N2" and the first reference node "B1" are conductive to each other, for example.

Note that the second and third switch circuits "SW2" and "SW3" perform switching operations only when the connection target of the fourth capacitor "CAP4" is switched from the positive voltage terminal "TOUTP" to the negative voltage terminal "TOUTM" and vice versa.

In addition, with the first to fourth controlling signals "SC1" to "SC4", the controlling circuit "CON" adjusts the timings of the first to fourth switch circuits "SW1" to "SW4" so as to prevent the first to fourth switch circuits "SW1" to "SW4" from being turned on at the same time.

By the operation described above, the voltage "VOUTP" at the positive voltage terminal "TOUTP" is controlled to be a predetermined value.

Next, another example of the output voltage boosting operation in the case of the positive voltage generation according to the second embodiment will be described.

Figure 10:
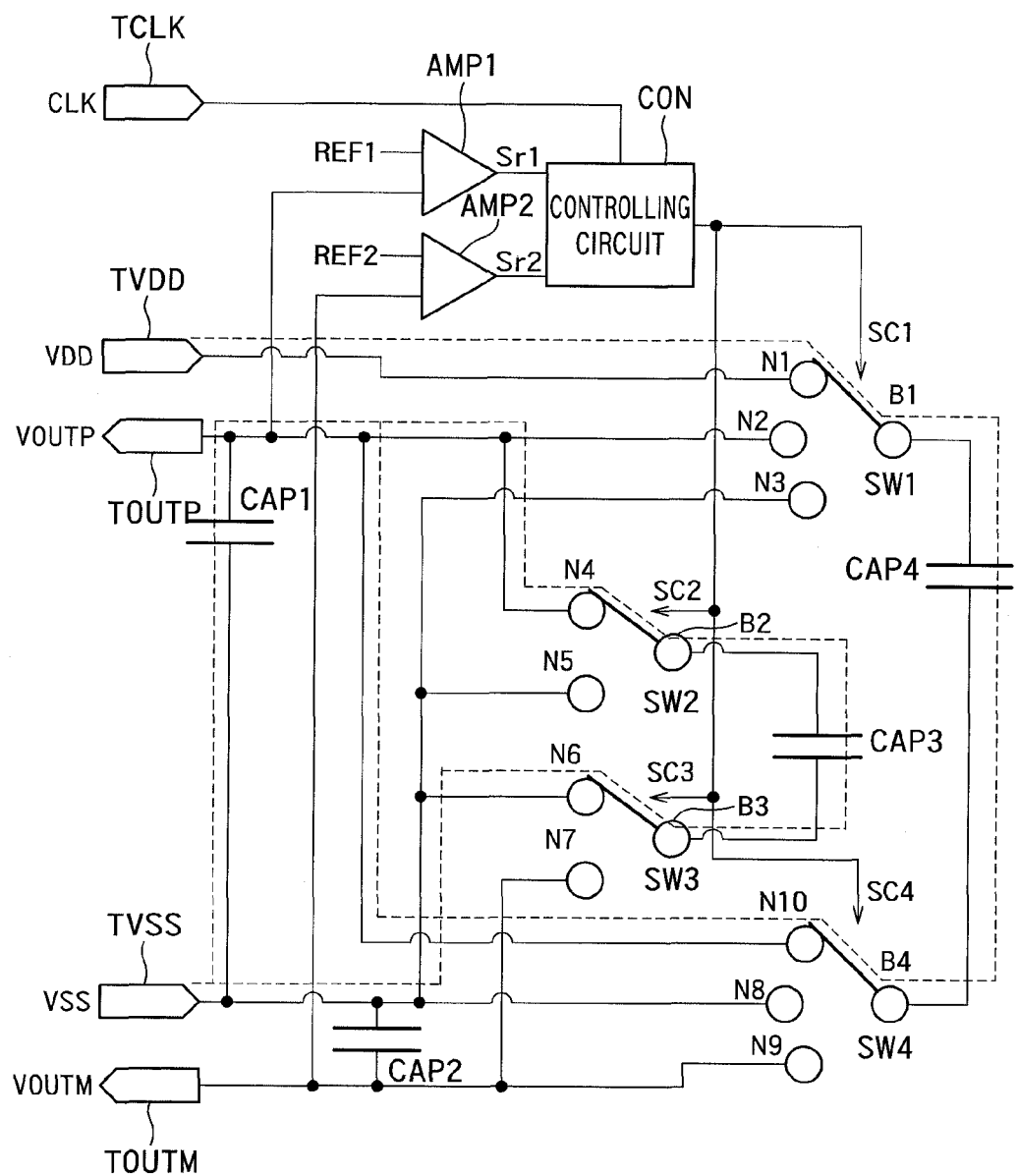
FIG. 10 is a circuit diagram showing examples of the states of the first to fourth switch circuit "SW1" to "SW4" in the positive voltage generation by the DC-DC converter 200 shown in FIG. 7.
Figure 11:
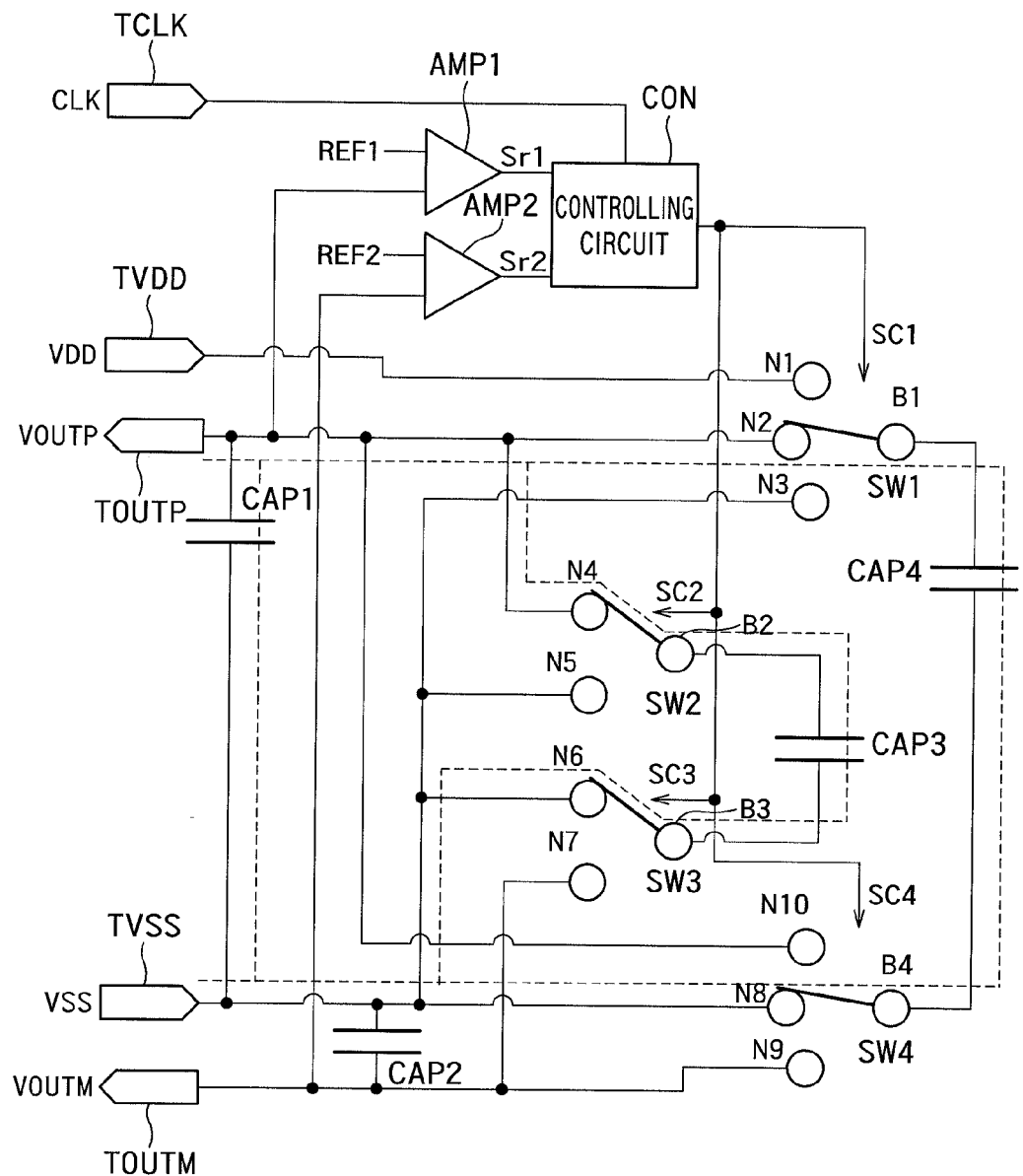
FIG. 11 is a circuit diagram showing examples of the states of the first to fourth switch circuit "SW1" to "SW4" in the positive voltage generation by the DC-DC converter 200 shown in FIG. 7.

FIGS. 10 and 11 are circuit diagrams showing examples of the states of the first to fourth switch circuit "SW1" to "SW4" in the positive voltage generation by the DC-DC converter 200 shown in FIG. 7.

For example, in the case of the positive voltage generation, the controlling circuit "CON" controls the first to fourth switch circuits "SW1" to "SW4" with the first to fourth controlling signals "SC1" to "SC4", thereby permitting conduction between the first node "N1" and the first reference node "B1" and the connection between the tenth node "N10" and the fourth reference node "B4" (FIG. 10).

As a result, the fourth capacitor "CAP4" and the first capacitor "CAP1" are connected in series between the power supply terminal "TVDD" and the grounding terminal "TVSS". That is, the first capacitor "CAP1" and the fourth capacitor "CAP4" are charged. Concerning the voltage of the fourth capacitor "CAP4", the voltage "VOUTP" is about a half of the power supply voltage.

At this point in time, in the example shown in FIG. 10, the second switch circuit "SW2" has permitted conduction between the fourth node "N4" and the second reference node "B2". Alternatively, however, the second switch circuit "SW2" may have permitted conduction between the fifth node "N5" and the second reference node "B2".

Similarly, in the example shown in FIG. 10, the third switch circuit "SW3" has permitted conduction between the sixth node "N6" and the third reference node "B3". Alternatively, however, the third switch circuit "SW3" may have permitted conduction between the seventh node "N7" and the third reference node "B3".

Then, the controlling circuit "CON" controls the first to fourth switch circuits "SW1" to "SW4" with the first to fourth controlling signals "SC1" to "SC4", thereby permitting conduction between the fourth node "N4" and the second reference node "B2" and the connection between the sixth node "N6" and the third reference node "B3" (FIG. 11).

Then, the controlling circuit "CON" controls the first to fourth switch circuits "SW1" to "SW4" with the first to fourth controlling signals "SC1" to "SC4", thereby permitting conduction between the second node "N2" and the first reference node "B1" and the connection between the eighth node "N8" and the fourth reference node "B4" (FIG. 11).

As a result, the first and third capacitors "CAP1" and "CAP3" and the fourth capacitor "CAP4" are connected in parallel with each other and exchange charges.

Therefore, the voltage "VOUTP" at the positive voltage terminal "TOUTP" increases.

Since the ratio of the sum of the capacitances of the first capacitor "CAP1" and the third capacitor "CAP3" to the capacitance of the fourth capacitor "CAP4" increases, a ripple voltage at the positive voltage terminal "TOUTP" is reduced.

In the case of the positive voltage generation, after conduction between the second node "N2" and the first reference node "B1" and conduction between the eighth node "N8" and the fourth reference node "B4" are permitted, if the voltage at the positive voltage terminal "TOUTP" is lower than the first reference voltage "REF1", the controlling circuit "CON" controls the first and fourth switch circuits "SW1" and "SW4" with the first and fourth controlling signals "SC1" and "SC4" to alternately switch between the state where the first node "N1" and the first reference node "B1" are conductive to each other and the tenth node "N10" and the fourth reference node "B4" are conductive to each other and the state where the second node "N2" and the first reference node "B1" are conductive to each other and the eighth node "N8" and the fourth reference node "B4" are conductive to each other.

On the other hand, in the case of the positive voltage generation, if the voltage at the positive voltage terminal "TOUTP" is equal to or higher than the first reference voltage "REF1", the controlling circuit "CON" controls the first and fourth switch circuits "SW1" and "SW4" with the first and fourth controlling signals "SC1" and "SC4" to keep the state where the second node "N2" and the first reference node "B1" are conductive to each other and the eight node "N8" and the fourth reference node "B4" are conductive to each other, for example.

Note that the second and third switch circuits "SW2" and "SW3" perform switching operations only when the connection target of the fourth capacitor "CAP4" is switched from the positive voltage terminal "TOUTP" to the negative voltage terminal "TOUTM" and vice versa.

In addition, with the first to fourth controlling signals "SC1" to "SC4", the controlling circuit "CON" adjusts the timings of the first to fourth switch circuits "SW1" to "SW4" so as to prevent the first to fourth switch circuits "SW1" to "SW4" from being turned on at the same time.

By the operation described above, the voltage "VOUTP" at the positive voltage terminal "TOUTP" is controlled to be a predetermined value.

Next, an example of an output voltage boosting operation in a case of negative voltage generation according to the second embodiment will be described.

Figure 12:
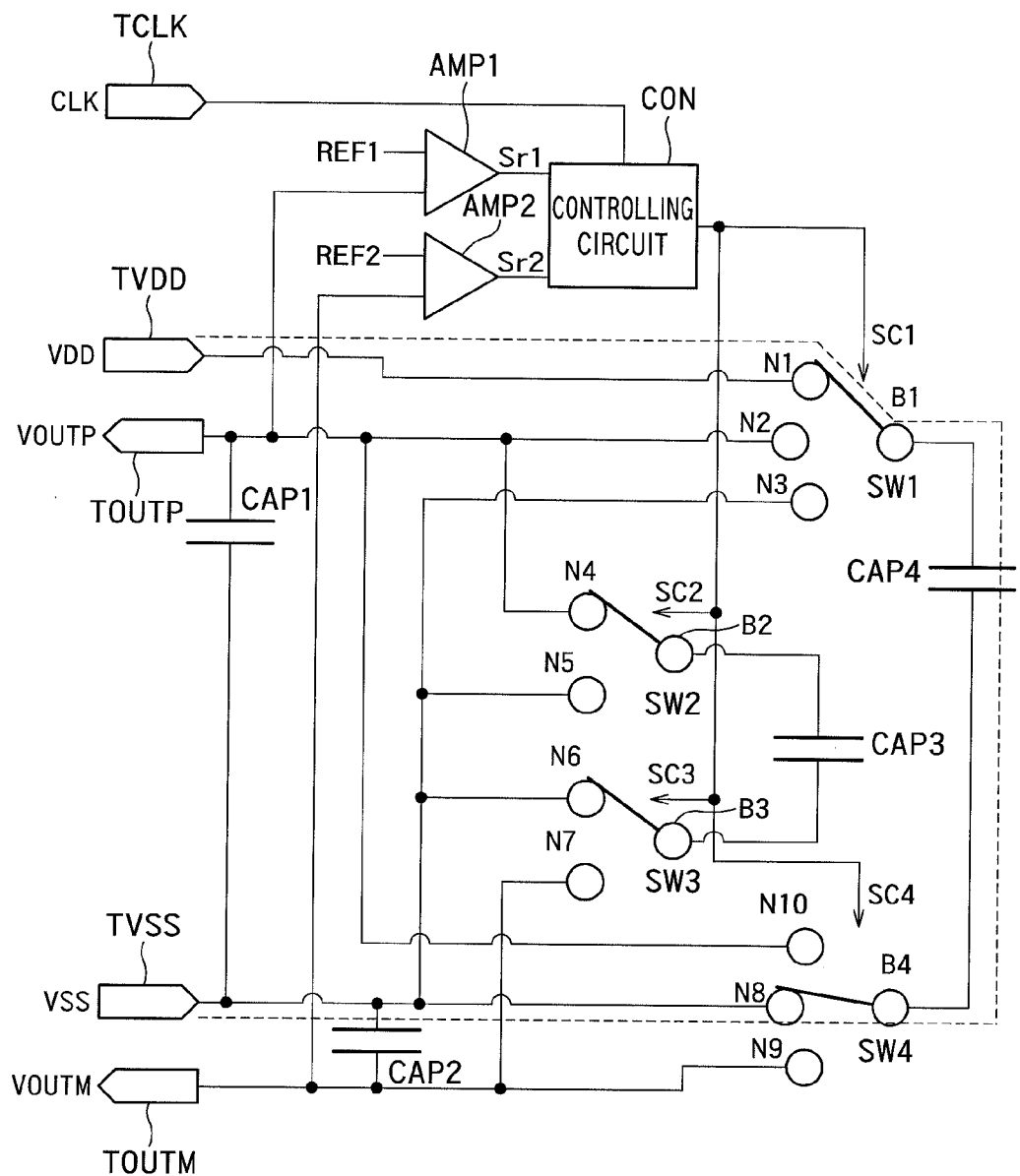
FIG. 12 is a circuit diagram showing an example of the states of the first to fourth switch circuit "SW1" to "SW4" in the case of the negative voltage generation by the DC-DC converter 200 shown in FIG. 7.
Figure 13:
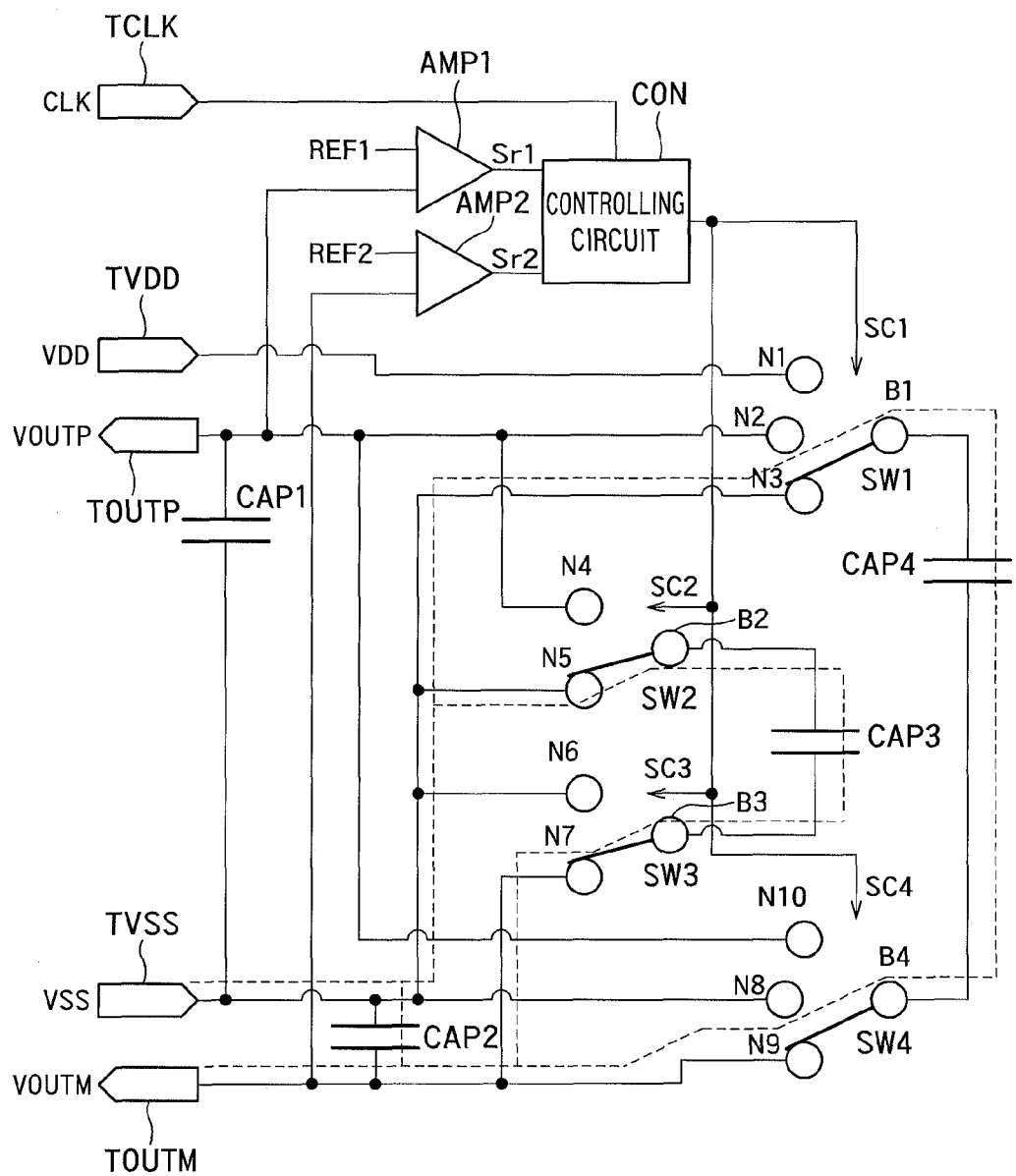
FIG. 13 is a circuit diagram showing an example of the states of the first to fourth switch circuit "SW1" to "SW4" in the case of the negative voltage generation by the DC-DC converter 200 shown in FIG. 7.

FIGS. 12 and 13 are circuit diagrams showing an example of the states of the first to fourth switch circuit "SW1" to "SW4" in the case of the negative voltage generation by the DC-DC converter 200 shown in FIG. 7.

For example, in the negative voltage generation, the controlling circuit "CON" controls the first to fourth switch circuits "SW1" to "SW4" with the first to fourth controlling signals "SC1" to "SC4", thereby permitting conduction between the first node "N1" and the first reference node "B1" and the connection between the eighth node "N8" and the fourth reference node "B4" (FIG. 12).

As a result, as in the case of the positive voltage generation described above, the fourth capacitor "CAP4" is charged.

At this point in time, in the example shown in FIG. 12, the second switch circuit "SW2" has permitted conduction between the fourth node "N4" and the second reference node "B2". Alternatively, however, the second switch circuit "SW2" may have permitted conduction between the fifth node "N5" and the second reference node "B2".

Similarly, in the example shown in FIG. 12, the third switch circuit "SW3" has permitted conduction between the sixth node "N6" and the third reference node "B3". Alternatively, however, the third switch circuit "SW3" may have permitted conduction between the seventh node "N7" and the third reference node "B3".

Then, the controlling circuit "CON" controls the first to fourth switch circuits "SW1" to "SW4" with the first to fourth controlling signals "SC1" to "SC4", thereby permitting conduction between the fifth node "N5" and the second reference node "B2" and the connection between the seventh node "N7" and the third reference node "B3" (FIG. 13).

Then, the controlling circuit "CON" controls the first to fourth switch circuits "SW1" to "SW4" with the first to fourth controlling signals "SC1" to "SC4", thereby permitting conduction between the third node "N3" and the first reference node "B1" and the connection between the ninth node "N9" and the fourth reference node "B4" (FIG. 13).

As a result, the second and third capacitors "CAP2" and "CAP3", and the fourth capacitor "CAP4" are connected in parallel with each other and exchange charges.

Therefore, the voltage "VOUTM" at the negative voltage terminal "TOUTM" increases.

Since the ratio of the sum of the capacitances of the second capacitor "CAP2" and the third capacitor "CAP3" to the capacitance of the fourth capacitor "CAP4" increases, a ripple voltage at the negative voltage terminal "TOUTM" is reduced.

In the case of the negative voltage generation, after conduction between the third node "N3" and the first reference node "B1" and conduction between the ninth node "N9" and the fourth reference node "B4" are permitted, if the voltage at the negative voltage terminal "TOUTM" is lower than the second reference voltage "REF2" (strictly speaking, if the absolute value of the voltage at the negative voltage terminal "TOUTM" is smaller than the absolute value of the second reference voltage "REF2"), the controlling circuit "CON" controls the first and fourth switch circuits "SW1" and "SW4" with the first and fourth controlling signals "SC1" and "SC4" to alternately switch between the state where the first node "N1" and the first reference node "B1" are conductive to each other and the eighth node "N8" and the fourth reference node "B4" are conductive to each other and the state where the third node "N3" and the first reference node "B1" are conductive to each other and the ninth node "N9" and the fourth reference node "B4" are conductive to each other.

On the other hand, in the case of the negative voltage generation, if the voltage at the negative voltage terminal "TOUTM" is equal to or higher than the second reference voltage "REF2" (strictly speaking, if the absolute value of the voltage at the negative voltage terminal "TOUTM" is equal to or greater than the absolute value of the second reference voltage "REF2"), the controlling circuit "CON" controls the first and fourth switch circuits "SW1" and "SW4" with the first and fourth controlling signals "SC1" and "SC4" to keep the state where the third node "N3" and the first reference node "B1" are conductive to each other and the ninth node "N9" and the fourth reference node "B4" are conductive to each other, for example.

Note that the second and third switch circuits "SW2" and "SW3" perform switching operations only when the connection target of the fourth capacitor "CAP4" is switched from the positive voltage terminal "TOUTP" to the negative voltage terminal "TOUTM" and vice versa.

In addition, with the first to fourth controlling signals "SC1" to "SC4", the controlling circuit "CON" adjusts the timings of the first to fourth switch circuits "SW1" to "SW4" so as to prevent the first to fourth switch circuits "SW1" to "SW4" from being turned on at the same time.

By the operation described above, the voltage "VOUTM" at the negative voltage terminal "TOUTM" is controlled to be a predetermined value.

Next, another example of the output voltage boosting operation in the negative voltage generation according to the second embodiment will be described.

Figure 14:
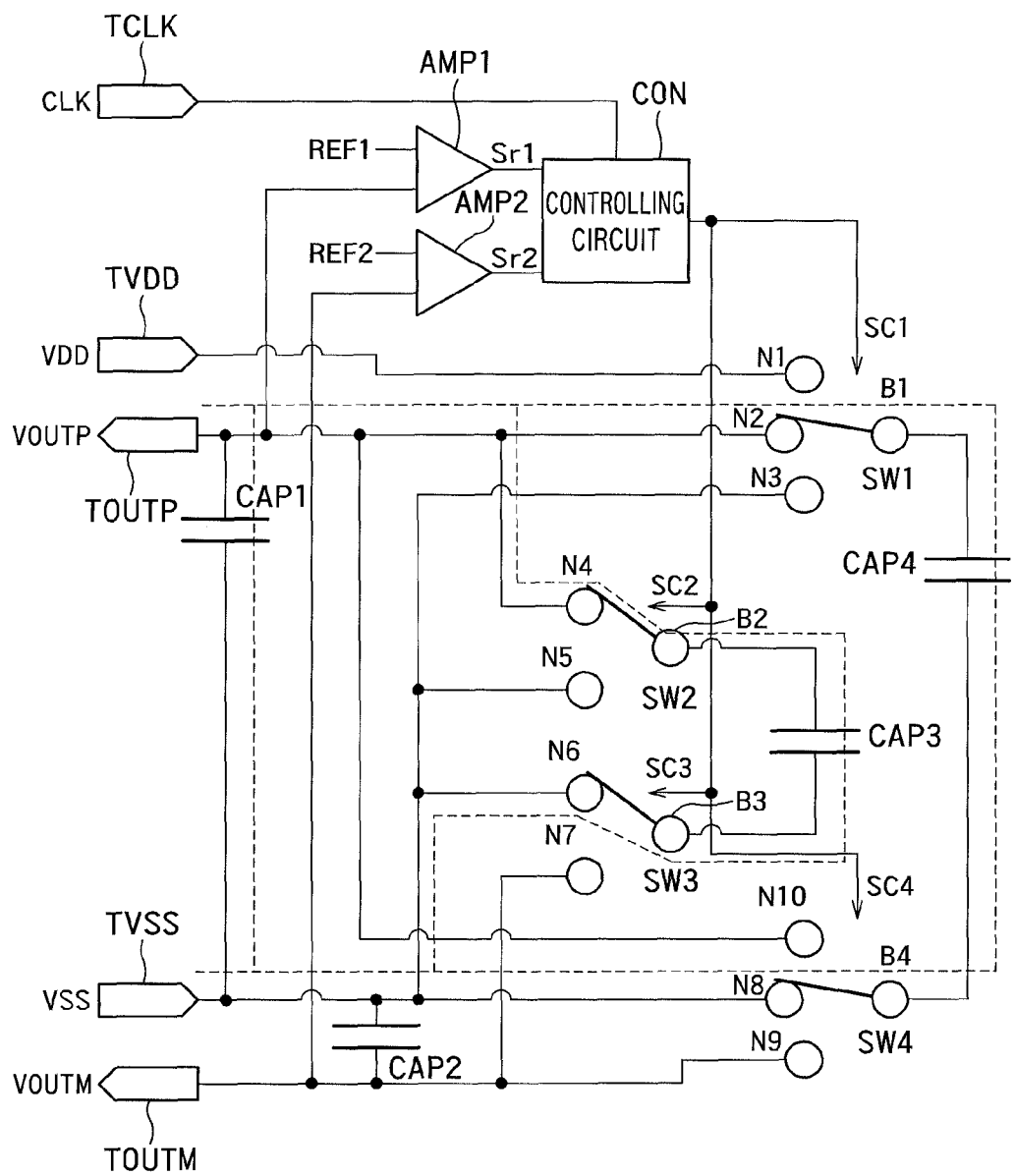
FIG. 14 is a circuit diagram showing another example of the states of the first to fourth switch circuits "SW1" to "SW4" in the case of the negative voltage generation by the DC-DC converter 200 shown in FIG. 7.
Figure 15:
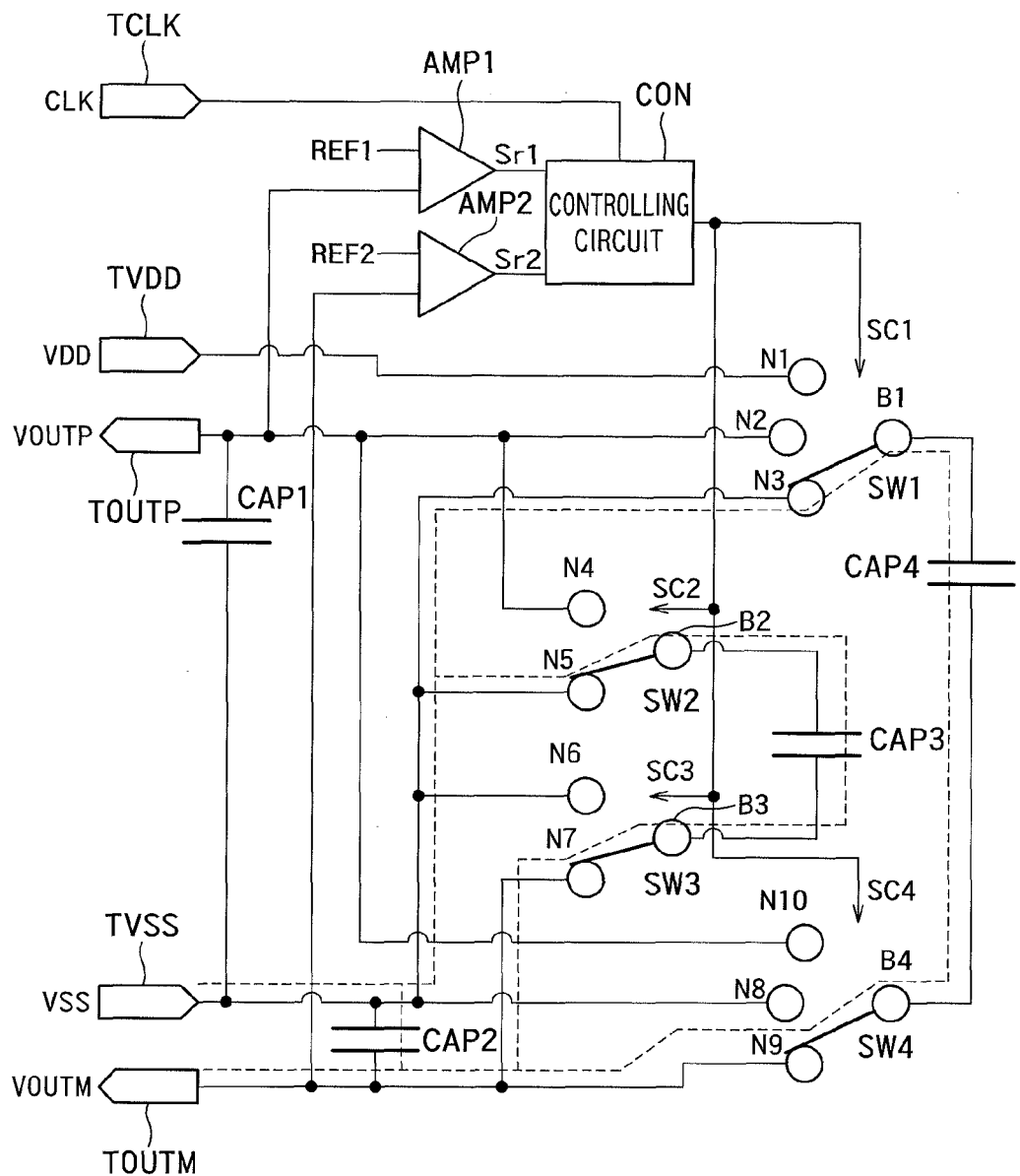
FIG. 15 is a circuit diagram showing another example of the states of the first to fourth switch circuits "SW1" to "SW4" in the case of the negative voltage generation by the DC-DC converter 200 shown in FIG. 7.

FIGS. 14 and 15 are circuit diagrams showing another example of the states of the first to fourth switch circuits "SW1" to "SW4" in the case of the negative voltage generation by the DC-DC converter 200 shown in FIG. 7.

As shown in FIG. 14, in the case of the negative voltage generation, the controlling circuit "CON" controls the first to fourth switch circuits "SW1" to "SW4" with the first to fourth controlling signals "SC1" to "SC4", thereby permitting conduction between the second node "N2" and the first reference node "B1" and tcondution between the eighth node "N8" and the fourth reference node "B4".

As a result, the fourth capacitor "CAP4" is charged.

At this point in time, in the example shown in FIG. 14, the second switch circuit "SW2" has permitted conduction between the fourth node "N4" and the second reference node "B2". Alternatively, however, the second switch circuit "SW2" may have permitted conduction between the fifth node "N5" and the second reference node "B2".

Furthermore, in the example shown in FIG. 14, the third switch circuit "SW3" has permitted conduction between the sixth node "N6" and the third reference node "B3". Alternatively, however, the third switch circuit "SW3" may have permitted conduction between the seventh node "N7" and the third reference node "B3".

Then, the controlling circuit "CON" controls the first to fourth switch circuits "SW1" to "SW4" with the first to fourth controlling signals "SC1" to "SC4", thereby permitting conduction between the fifth node "N5" and the second reference node "B2" and conduction between the seventh node "N7" and the third reference node "B3" (FIG. 15).

Then, the controlling circuit "CON" controls the first to fourth switch circuits "SW1" to "SW4" with the first to fourth controlling signals "SC1" to "SC4", thereby permitting conduction between the third node "N3" and the first reference node "B1" and conduction between the ninth node "N9" and the fourth reference node "B4" (FIG. 15).

As a result, the second and third capacitors "CAP2" and "CAP3", and the fourth capacitor "CAP4" are connected in parallel with each other and exchange charges.

Therefore, the voltage "VOUTM" at the negative voltage terminal "TOUTM" increases.

Since the ratio of the sum of the capacitances of the second capacitor "CAP2" and the third capacitor "CAP3" to the capacitance of the fourth capacitor "CAP4" increases, a ripple voltage at the negative voltage terminal "TOUTM" is reduced.

In the case of the negative voltage generation, after conduction between the third node "N3" and the first reference node "B1" is permitted, if the voltage at the negative voltage terminal "TOUTM" is lower than the second reference voltage "REF2" (strictly speaking, if the absolute value of the voltage at the negative voltage terminal "TOUTM" is smaller than the absolute value of the second reference voltage "REF2"), the controlling circuit "CON" controls the first switch circuit "SW1" with the first controlling signal "SC1" to alternately switch between the state where the second node "N2" and the first reference node "B1" are conductive to each other and the state where the third node "N3" and the first reference node "B1" are conductive to each other.

In addition, the controlling circuit "CON" controls the fourth switch circuit "SW4" with the fourth controlling signal "SC4" to alternately switch between the state where the eighth node "N8" and the fourth reference node "B4" are conductive to each other and the state where the ninth node "N9" and the fourth reference node "B4" are conductive to each other.

On the other hand, in the case of the negative voltage generation, if the voltage at the negative voltage terminal "TOUTM" is equal to or higher than the second reference voltage "REF2" (strictly speaking, if the absolute value of the voltage at the negative voltage terminal "TOUTM" is equal to or greater than the absolute value of the second reference voltage "REF2"), the controlling circuit "CON" controls the first switch circuit "SW1" with the first controlling signal "SC1" to keep the state where the third node "N3" and the first reference node "B1" are conductive to each other and the ninth node "N9" and the fourth reference node "B4" are conductive to each other, for example.

Note that the second and third switch circuits "SW2" and "SW3" perform switching operations only when the connection target of the fourth capacitor "CAP4" is switched from the positive voltage terminal "TOUTP" to the negative voltage terminal "TOUTM" and vice versa.

In addition, with the first to fourth controlling signals "SC1" to "SC4", the controlling circuit "CON" adjusts the timings of the first to fourth switch circuits "SW1" to "SW4" so as to prevent the first to fourth switch circuits "SW1" to "SW4" from being turned on at the same time.

By the operation described above, the voltage "VOUTM" at the negative voltage terminal "TOUTM" is controlled to be a predetermined value.

Note that the controlling circuit "CON" may control the first and fourth switch circuits "SW1" and "SW4" with the first and fourth controlling signals "SC1" and "SC4" to randomly change the period for which the first node "N1" and the first reference node "B1" are conductive to each other and the period for which the tenth node "N10" and the fourth reference node "B4" are conductive to each other.

For example, by discretely changing the duty cycle of the clock signal "CLK" and the periods for which the switch circuits are not connected to any poles, the controlling circuit "CON" can randomly change the period for which the first node "N1" and the first reference node "B1" are conductive to each other and the period for which the tenth node "N10" and the fourth reference node "B4" are conductive to each other by discretely changing the periods of the first and fourth controlling signals "SC1" and "SC4".

In this way, the maximum spurious level under a light load condition can be reduced.

As can be seen from the above description, the DC-DC converter according to the second embodiment can reduce the ripple voltage, as with the DC-DC converter according to the first embodiment.

In particular, according to the first embodiment, in the case of the positive voltage generation, the DC-DC converter can achieve high efficiency with reduced ripple only when the VDD voltage and the output voltage (VOUTP) are close to each other. According to the second embodiment, however, application is possible to an high efficient circuit configuration with reduced ripple when the output voltage is about a half of the power supply voltage.

According to this embodiment, furthermore, the power supply voltage may be monitored, and the operation mode may be switched depending on the status of the power supply voltage. Furthermore, the DC-DC converter according to this embodiment can also be used as a positive and negative power supply for a class-G amplifier, for example.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A DC-DC converter, comprising:
a first switch circuit that permits conduction between a first reference node and any one of a first node connected to a power supply terminal, a second node connected to a positive voltage terminal at which a positive voltage is output and a third node connected to a grounding terminal in response to a first controlling signal;
a second switch circuit that permits conduction between a second reference node and any one of a fourth node connected to the positive voltage terminal and a fifth node connected to the grounding terminal in response to a second controlling signal;
a third switch circuit that permits conduction between a third reference node and any one of a sixth node connected to the grounding terminal and a seventh node connected to a negative voltage terminal at which a negative voltage is output in response to a third controlling signal;
a fourth switch circuit that permits conduction between a fourth reference node and any one of an eighth node connected to the grounding terminal and a ninth node connected to the negative voltage terminal in response to a fourth controlling signal;
a first comparing circuit that compares a voltage at the positive voltage terminal and a preset positive first reference voltage and outputs a first comparison signal responsive to the comparison result;
a second comparing circuit that compares a voltage at the negative voltage terminal and a preset negative second reference voltage and outputs a second comparison signal responsive to the comparison result; and
a controlling circuit that outputs the first to fourth controlling signals based on the first and second comparison signals to control operations of the first to fourth switch circuits,
wherein a first capacitor is connected between the positive voltage terminal and the grounding terminal,
a second capacitor is connected between the grounding terminal and the negative voltage terminal,
a third capacitor is connected between the second reference node and the third reference node, and
a fourth capacitor is connected between the first reference node and the fourth reference node.

2. The DC-DC converter according to claim 1, wherein in a case of positive voltage generation,
the controlling circuit controls the first to fourth switch circuits with the first to fourth controlling signals, thereby
permitting conduction between the first node and the first reference node and conduction between the eighth node and the fourth reference node,
then permitting conduction between the fourth node and the second reference node and conduction between the sixth node and the third reference node, and
then permitting conduction between the second node and the first reference node.

3. The DC-DC converter according to claim 2, wherein in a case where the voltage at the positive voltage terminal is lower than the first reference voltage, the controlling circuit controls the first switch circuit with the first controlling signal to alternately switch between the state where the first node and the first reference node are conductive to each other and the state where the second node and the first reference node are conductive to each other.

4. The DC-DC converter according to claim 2, wherein in a case where the voltage at the positive voltage terminal is equal to or higher than the first reference voltage, the controlling circuit controls the first switch circuit with the first controlling signal to keep the state where the second node and the first reference node are conductive to each other.

5. The DC-DC converter according to claim 2, wherein the controlling circuit randomly changes a period for which the first node and the first reference node are conductive to each other by controlling the first switch circuit with the first controlling signal, and randomly changes a period for which the eighth node and the fourth reference node are conductive to each other by controlling the fourth switch circuit with the fourth controlling signal.

6. The DC-DC converter according to claim 1, wherein in a case of negative voltage generation,
the controlling circuit controls the first to fourth switch circuits with the first to fourth controlling signals, thereby
permitting conduction between the first node and the first reference node and conduction between the eighth node and the fourth reference node,
then permitting conduction between the fifth node and the second reference node and conduction between the seventh node and the third reference node, and
then permitting conduction between the third node and the first reference node and conduction between the ninth node and the forth reference node.

7. The DC-DC converter according to claim 6, wherein in a case where the voltage at the negative voltage terminal is lower than the second reference voltage, the controlling circuit controls the first and fourth switch circuits with the first and fourth controlling signals to alternately switch between the state where the first node and the first reference node are conductive to each other and the eighth node and the fourth reference node are conductive to each other and the state where the third node and the first reference node are conductive to each other and the ninth node and the fourth reference node are conductive to each other.

8. The DC-DC converter according to claim 6, wherein in a case where the voltage at the negative voltage terminal is equal to or higher than the second reference voltage, the controlling circuit controls the first and fourth switch circuits with the first and fourth controlling signals to keep the state where the third node and the first reference node are conductive to each other and the ninth node and the fourth reference node are conductive to each other.

9. The DC-DC converter according to claim 6, wherein the controlling circuit randomly changes a period for which the first node and the first reference node are conductive to each other by controlling the first switch circuit with the first controlling signal, and randomly changes a period for which the eighth node and the fourth reference node are conductive to each other by controlling the fourth switch circuit with the fourth controlling signal.

10. The DC-DC converter according to claim 1, wherein in a case of negative voltage generation,
the controlling circuit controls the first to fourth switch circuits with the first to fourth controlling signals, thereby
permitting conduction between the second node and the first reference node and the connection between the eighth node and the fourth reference node,
then permitting conduction between the fifth node and the second reference node and conduction between the seventh node and the third reference node, and
then permitting conduction between the third node and the first reference node and conduction between the ninth node and the fourth reference node.

11. The DC-DC converter according to claim 10, wherein in a case where the voltage at the negative voltage terminal is lower than the second reference voltage, the controlling circuit controls the first switch circuit with the first controlling signal to alternately switch between the state where the second node and the first reference node are conductive to each other and the eighth node and the fourth reference node are conductive to each other and the state where the third node and the first reference node are conductive to each other and the ninth node and the fourth reference node are conductive to each other.

12. The DC-DC converter according to claim 10, wherein in a case where the voltage at the negative voltage terminal is equal to or higher than the second reference voltage, the controlling circuit controls the first switch circuit with the first controlling signal to keep the state where the third node and the first reference node are conductive to each other and the fourth node and the fourth reference node are conductive to each other.

13. The DC-DC converter according to claim 10, wherein the controlling circuit randomly changes a period for which the second node and the first reference node are conductive to each other by controlling the first switch circuit with the first controlling signal, and randomly changes a period for which the eighth node and the fourth reference node are conductive to each other by controlling the fourth switch circuit with the fourth controlling signal.

14. The DC-DC converter according to claim 1, wherein the fourth switch circuit is configured to permit conduction between the fourth reference node and any one of the eighth node, the ninth node and a tenth node connected to the positive voltage terminal in response to the fourth controlling signal.

15. The DC-DC converter according to claim 14, wherein in a case of positive voltage generation,
the controlling circuit controls the first to fourth switch circuits with the first to fourth controlling signals, thereby permitting conduction between the first node and the first reference node and conduction between the tenth node and the fourth reference node,
then permitting conduction between the fourth node and the second reference node and conduction between the sixth node and the third reference node, and
then permitting conduction between the second node and the first reference node and conduction between the eighth node and the forth reference node.

16. The DC-DC converter according to claim 15, wherein in a case where the voltage at the positive voltage terminal is lower than the first reference voltage, the controlling circuit controls the first and fourth switch circuits with the first and fourth controlling signals to alternately switch between the state where the first node and the first reference node are conductive to each other and the tenth node and the fourth reference node are conductive to each other and the state where the second node and the first reference node are conductive to each other and the eighth node and the fourth reference node are conductive to each other.

17. The DC-DC converter according to claim 15, wherein in a case where the voltage at the positive voltage terminal is equal to or higher than the first reference voltage, the controlling circuit controls the first and fourth switch circuits with the first and fourth controlling signals to keep the state where the second node and the first reference node are conductive to each other and the eighth node and the fourth reference node are conductive to each other.

18. The DC-DC converter according to claim 15, wherein the controlling circuit randomly changes a period for which the first node and the first reference node are conductive to each other and a period for which the tenth node and the fourth reference node are conductive to each other by controlling the first and fourth switch circuits with the first and fourth controlling signals.

19. The DC-DC converter according to claim 1, wherein the first reference voltage is equal to the absolute value of the second reference voltage.

* * * * *